United States Patent [19]

Vanderpool et al.

[11] Patent Number: 4,806,517

[45] Date of Patent: Feb. 21, 1989

[54] METHOD FOR MAKING PELLETED PHOSPHATED CATALYSTS DERIVED FROM GROUP IVB TRANSITION METAL OXIDES AND CATALYSTS THUS PREPARED

[75] Inventors: Steven H. Vanderpool, New Braunfels; Lewis W. Watts, Jr., Austin; John M. Larkin, Austin; Terry L. Renken, Austin, all of Tex.

[73] Assignee: Texaco Inc., White Plains, N.Y.

[21] Appl. No.: 24,932

[22] Filed: Mar. 12, 1987

Related U.S. Application Data

[63] Continuation-in-part of Ser. No. 821,090, Jan. 21, 1986, abandoned, which is a continuation-in-part of Ser. No. 455,160, Jan. 3, 1983, abandoned, which is a continuation-in-part of Ser. No. 455,158, Jan. 3, 1983, abandoned, which is a continuation-in-part of Ser. No. 455,159, Jan. 3, 1983, abandoned, which is a continuation-in-part of Ser. No. 455,156, Jan. 3, 1983, abandoned, which is a continuation-in-part of Ser. No. 455,155, Jan. 3, 1983, abandoned, which is a continuation-in-part of Ser. No. 455,153, Jan. 3, 1983, abandoned.

[51] Int. Cl.$^4$ .............................................. B01J 27/18
[52] U.S. Cl. ..................................................... 502/208
[58] Field of Search ................................ 502/162, 208

[56] References Cited

U.S. PATENT DOCUMENTS

| | | | |
|---|---|---|---|
| 2,584,102 | 2/1950 | Mavity | 502/208 X |
| 2,824,073 | 2/1958 | Rylander et al. | 502/208 |
| 2,854,498 | 9/1958 | Zimmerschied | 502/208 |
| 2,921,081 | 1/1960 | Zimmerschied | 502/208 |
| 3,130,147 | 4/1964 | Dwyer et al. | 502/208 |
| 3,416,884 | 12/1968 | Stynes et al. | 502/208 |
| 3,448,164 | 6/1969 | Holm et al. | 502/208 |
| 4,036,881 | 7/1977 | Brennan et al. | 502/208 |
| 4,044,053 | 8/1977 | Brennan et al. | 502/162 |
| 4,400,568 | 8/1983 | Hofmann et al. | 502/208 |
| 4,409,418 | 10/1983 | Johnson et al. | 502/208 |

OTHER PUBLICATIONS

"Refractories" by F. H. Norton, McGraw-Hill, 1949, pp. 318-319.

*Primary Examiner*—W. J. Shine
*Attorney, Agent, or Firm*—Jack H. Park; Kenneth R. Priem; Carl G. Ries

[57] ABSTRACT

This invention is directed to novel catalyst compositions based on a pelleted group IVb transition metal oxide to which about 0.5 to about 7 wt. % of phosphorus is thermally chemically bonded by a novel process wherein the pellets are impregnated with a liquid water-soluble phosphorus compound containing phosphorus-oxygen bonds, thermally treated after removal of unabsorbed liquid for 0.5 to 5 hours at 100°-150° C. to chemically bond the recited amount of phosphorus to the pellets followed by calcination at 200° to 900° C. to stabilize the pellets. Also disclosed is a regenerative process for preparing predominantly linear polyethylenepolyamines from ethylenediamine and monoethanolamine using the novel catalyst compositions.

43 Claims, No Drawings

METHOD FOR MAKING PELLETED PHOSPHATED CATALYSTS DERIVED FROM GROUP IVB TRANSITION METAL OXIDES AND CATALYSTS THUS PREPARED

This application is a continuation-in-part of copending Vanderpool application Ser. No. 821,090 filed Jan. 21, 1986, and entitled "Pelleted Phosphated Catalysts Derived from Group IVb transition Metal Oxides and Process for the Preparation of Linear Polyethylenepolyamines" (now abandoned) which, in turn, is a continuation-in-part of copending Vanderpool application Ser. No. 455,160 filed Jan. 3, 1983 and entitled "Catalysts and Preparation of Linear Polyethylenepolyamines Therewith" (now abandoned); copending Vanderpool et al. application Ser. No. 455,158 filed Jan. 3, 1983 and entitled "Calcined Catalyst and Preparation of Linear Polyethylenepolyamines Therewith" (now abandoned); copending Larkin et al. application Ser. No. 455,159 filed Jan. 3, 1983 and entitled "Linear Polyethylenepolyamine Preparation and Catalyst" (now abandoned); copending Vanderpool et al. application Ser. No. 455,156 filed Jan. 3, 1983 and entitled "Modified Catalysts and Preparation of Linear Polyethylenepolyamines Therewith" (now abandoned); copending Vanderpool et al. application Ser. No. 455,155 filed Jan. 3, 1983 and entitled "Preparation of Linear Polyethylenepolyamines from Novel Catalysts" (now abandoned); and copending Renken application Ser. No. 455,153 filed Jan. 3, 1983 and entitled "Supported Phosphate Catalysts and Preparation of Linear Polyethylenepolyamines Therewith" (now abandoned).

BACKGROUND OF THE INVENTION

1. Technical Field of the Invention

This invention relates to a novel method of making thermally and chemically stable pelleted catalysts derived from a group IVb transition metal oxide and a water-soluble or liquid phosphorus compound and to the catalysts thus prepared. The catalysts prepared by the method of the present invention will have from about 0.5 to about 5 wt. % of phosphorus thermally, chemically bonded to the pellets in the form of hydroxy-containing phosphate groups.

2. Prior Art

Heretofore, polyethylenepolyamine compounds such as diethylenetriamine, triethylenetetramine and the higher homologs have been produced by the reaction of an alkyl halide such as ethylene dichloride with an amine such as ammonia or ethylenediamine at elevated temperatures and pressures. Normally, relatively high yields of predominantly non-cyclic polyethylenepolyamine compounds are obtained from this process with varying yields of heterocyclic amines. The large amounts of energy required to produce the reactants as well as the difficult separation procedures required to recover the more valuable linear polyethylenepolyamines diminish the usefulness of the ethylene dichloride process. The hydrohalide salts of ammonia and the polyethylenepolyamine products must also undergo difficult and time consuming caustic neutralization to yield the free polyethylenepolyamines.

It has heretofore been known that phosphates can be used to catalyze reactions to produce predominantly heterocyclic rather than linear products. Thus, U.S. Pat. No. 3,297,701 teaches the use of aluminum phosphate to catalyze the reaction of ethanolamines and polyethylenepolyamines to yield cyclic compounds. U.S. Pat. No. 3,342,820 discloses the use of aluminum phosphate for the preparation of heterocyclic compounds such as triethylenediamine. As another example, U.S. Pat. No. 4,103,087 also discloses the use of aluminum phosphate catalysts for producing heterocyclic product compounds.

More recently, investigators have found that more linear products can also be obtained in a catalyst conversion. Thus, Ford et al. U.S. Pat. No. 4,316,840 discloses the preparation of polyalkylenepolyamines from ethylene diamine utilizing a metal nitrate or sulfate as a catalyst. U.S. Pat. No. 4,314,083 discloses the reaction of ethylenediamine with monoethanolamine to prepare noncyclic polyalkylenepolyamines using, as a catalyst, a salt of a nitrogen or sulfur-containing compound.

In invention originating in our laboratories, Brennan et al, in U.S. Pat. No. 4,036,881 discloses the use of phosphorus-containing catalysts to catalyze the reaction of ethylenediamine with monoethanolamine. Excellent results were obtained when the reaction was conducted in an autoclave. However, when the phosphorus compound was supported on silica or diatomaceous earth, good results were obtained only at comparatively low conversions. Brennan et al. U.S. Pat. No. 4,044,053 is also relevant in this regard. Copending application Ser. No. 453,841 of Brennan, now U.S. Pat. No. 4,448,997, is directed to an alumina phosphate-type catalyst composition wherein the novel feature is the method of preparing a catalyst from alumina phosphoric acid, ammonium hydroxide and water. Excellent results were obtained using a catalyst of this nature in bath-type reactions. Brennan U.S. Pat. No. 4,103,087 discloses the use of pelleted aluminum phosphate to prepare di-(N,N-disubstituted amino)alkanes.

French Pat. No. 1,317,359 dated Feb. 8, 1963, discloses the preparation of granulated zirconium phosphate and its use as an ion-exchange resin. Winkler at al. in a 1966 publication [Deutsche Akad. Wiss., Berlin, Germany, Z. Anorg. Allgen. Chem. 346 (1-2), 92–112 (1966)] disclose compounds of the general formula $HX^{iv}P_2O_3$ wherein X represents arsenic, antimony and mixtures thereof. Also disclosed are compounds of the general formula $H_2X^{iv}P_2O_3$, wherein X represents silicon, germanium, tin, lead, titanium and zirconium. It is shown that the group IV phosphates have cation exchange properties.

Daniel Br. Apcn. 2,092,467 published Aug. 18, 1982, modifies iron phosphate catalysts disclosed in Cavaterra U.S. Pat. No. 3,948,959 for making methacrylic acid from isobutyric acid. Daniel uses such catalysts in admixture with a support prepared by calcining the dried powder recovered from a slurry of silica with phosphoric acid. Daniel teaches that the support is inert and that titania or zirconia can also be used.

Tawil et al. U.S. Pat. No. 4,025,608 is directed to the reaction of a zirconium salt with phosphoric acid or a phosphate to prepare granular zirconium phosphate for use as an ion exchanger. Zimmerschied et al. U.S. Pat. No. 2,921,081 discloses catalysts for use in the conversion of olefins that are prepared by reacting a zirconium halide with a designated class of phosphoric acids. Bates U.S. Pat. No. 2,349,243 shows treatment of hydrocarbons with a zirconium phosphate prepared by reacting a phosphoric acid with a soluble salt of zirconium such as the nitrate, sulfate, chloride or oxychloride. Stynes et al. in U.S. Pat. No. 3,416,884 prepare crystalline zirconium phosphates by thermally treating zirconium phosphate with phosphoric acid to provide products that are useful as ion exchangers and catalysts. Dwyer et al. U.S. Pat. No. 3,130,147 is concerned with cracking hydrocarbons using an acidic catalyst comprising oxides of aluminum, zirconium and phosphorus prepared by reacting water soluble salts of aluminum and zirconium with certain oxyacids of phosphorus and the salts thereof.

Inoue et al. U.S. Pat. No. 4,018,706 is directed ot the purification of exhaust gases using a support containing an oxide complex of titanium, phosphorus and aluminum. The complex is prepared by mixing a water soluble titanium compound such as titanium tetrachloride or titanium sulfate with a water soluble phosphorus compound such as phosphoric acid. In Holm U.S. Pat. No. 3,448,164 catalysts are disclosed that can contain titania and can be prepared, for example, by coprecipitating titanium metallates or a titanium oxide with aluminum phosphate.

Rylander et al. U.S. Pat. No. 2, 824,073 is concerned with the manufacture of a titanium-phosphoric acid catalyst that can be prepared by mixing titania with triphosphoric acid to form a doughy mixture which is thereafter shaped (e.g., by extrusion or molding) and heated to 240° C. to induce a water-liberating exothermic reaction that can be effected at 240° to 330° C. Heating is then continued at higher temperatures (e.g., 380° to 600° C.) for 0.5 to 4 hours to prepare a mechanically stable product. In an example, a catalyst active for the polymerization of propylene was prepared by mixing 79.9 grams of $TiO_2$ with about 80 grams of commercial polyphosphoric acid at room temperature, heating the mixture to 250° C. where a vigorous exothermic reaction was observed, followed by heating to 380° C. The patentees also teach that titanium dioxide does not react with meta-, ortho- or pyro-phosphoric acids to produce catalysts (i.e., they are substantially inactive in catalyzing the polymerization of propylene under the standardized conditions Rylander et al. employed in their experiments). In addition, Rylander et al. teach that the activity of catalysts in the polymerization of propylene varies with the ratio of $TiO_2$ to triphosphoric acid, indicating that reaction products wherein the weight ratio of $TiO_2$ to commercial polyphosphoric acid is 2 or more are inactive.

On the assumption that all of the triphosphoric acid reacts with $TiO_2$, the catalysts of Rylander et al. wherein the weight ratio of $TiO_2$ to triphosphoric acid ranges from about 0.1 to about 2 will contain from about 12 to about 33 wt. % of phosphoruc. It can be calculated that catalyst compositions of the present invention prepared from titania and triphosphoric acid and containing from about 0.5 to about 6 wt. % of phosphorus would be, using the statements of Rylander et al. as a guide, catalysts formed by reacting titania with triphosphoric acid in the weight ratio of titania to triphosphoric acid of about 5 to 70.

Hofmann et al. U.S. Pat. No. 4,400,568 is directed to catalysts useful in the oxidative dehydrogenation of organic compounds, such as the oxidative dehydrogenation of ethyl benzene to form styrene. The Hofmann et al. catalysts are prepared by adding excess phosphoric acid to a soluble zirconium salt to form a gel-like amorphous precipitate. The precipitate is impregnated with at least 10M orthophosphoric acid to form a crystalline solid having a ratio of $PO_4$ to Zi between 2 and 3.

U.S. Pat. No. 2,584,102 to Mavity discloses a method for polymerizing olefins using a calcined composite of phosphorus and a carrier. This composite is treated with a phosphorus halide, an essential active ingredient of the catalyst is an acid of phosphorus constituting more than 50 wt. % of the catalyst mixture and, preferably, about 60 to 75 wt. % of the catalyst.

The text, "Refractories", by F. H. Norton (McGraw-Hill Book Company, Inc., 1949) in pages 318 and 319 discloses hafnium oxide, titanium oxide and zirconium oxides as well-known refractories.

SUMMARY OF THE INVENTION

A novel method is disclosed for preparing novel pelleted group IVb metal oxide-phosphate type catalysts. The starting materials are a pelleted group IVb transition metal oxide and an aqueous solution of a water-soluble phosphorus compound. The pellets formed by the process of the present invention are stable against significant pellet deterioration for a period of at least 1000 hours when used to catalyze the reaction of monoethanolamine with ethylenediamine.

The catalysts are extremely useful in the improved production of predominantly linear polyethylenepolyamines from ethylenediamine and monoethanolamine. The novel phosphate-type catalysts of the claimed invention can be prepared by treating a pelleted group IVb metal oxide in a manner to be described with a phosphorus compound such that, in a thermally activated condition, the phosphorus is chemically bound to the surface of the pelleted group IVb metal oxide. The novel catalyst compositions when at least partially deactivated in the continuous production of linear polyethylenepolyamine reaction products from monoethanolamine and ethylenediamine can be regenerated by treatment with oxygen under controlled regeneration conditions, as disclosed in Vanderpool U.S. Pat. No. 4,540,822, issued Sept. 10, 1984.

Although good results are obtained when the catalysts of the present invention are used to catalyze the reaction of monoethanolamine with ethylene diamine, it is to be remembered that the source of the phosphorus is important insofar as the stability, activity and selectivity of the catalyst is concerned. Table II-B shows that the amount of phosphorus bonded to the titania and the strength of the result pellets varied from source to source. Table II-A shows a similar variance with respect to activity and selectivity. Thus, for best results, it is necessary to correlate the source of the phosphorus with the steps and conditions employed in making the catalyst because different sources of phosphorus can lead to different (and not always optimum) results with respect to catalyst stability, activity and selectivity.

DETAILED DESCRIPTION

In one aspect, the invention is directed to a method for preparing catalytically active compositions from a pelleted group IVb transition metal oxide and an aqueous solution of a water soluble phosphorus compound containing phosphorus-oxygen bonds. In another aspect the invention is directed to an improved catalyst composition comprising a pelleted group IVb metal oxide having about 0.5 to about 6 wt. % of phosphorus chemically bonded to the surface thereof by thermal activation. The inventor is unaware of all of the precise structural differences between the claimed catalysts and previous phosphate catalysts that have been tried in such reactions, but is cognizant of substantially higher rates of conversion to linear polyethylenepolyamines with the claimed catalysts.

A preferred class of the pelleted catalyst compositions of the present invention are those wherein the group IVb metal oxide is titania. A subclass are those wherein titanium triphosphate, $HTi_2(PO_4)_3$ is incorporated into the crystal lattice of titania pellets.

The novel catalyst compositions catalyze the reaction of ethylenediamine with monoethanolamine at a temperature of from about 250° C. to about 400° C., preferably from about 300° C. to about 350° C. and a pressure of from about 500 (34.47 bar gauge) to about 3000 psig. (206.8 bar gauge) and preferably from about 1000 (68.9 bar gauge) to about 2000 psig. (137.8 bar gauge.) Higher temperatures and pressures can be used, if desired, but there is no particular advantage in using such higher temperatures and/or pressures.

The pelleted catalyst compositions of the present invention are normally employed as a fixed bed of catalyst in a continuous reaction system. In a continuous process of this nature, the time of contact of the reactants with the catalyst is one of the interrelated factors that those skilled in the art will adjust, along with temperature, pressure, bed geometry, pellet size, etc. in order to obtain a desired rate of reaction and, hence, a desired percentage of conversion of the reactants. Thus, in a continuous process, it is not necessary to drive the reaction to completion because unreacted feedstock components can be recycled to the reactor.

It is customary to use cylindrically-shaped catalyst pellets having a diameter essentially equal to the length thereof, such as diameters and lengths ranging from about 0.794 mm (1/32 inch) to about 9.525 mm (⅜ inch). It will be understood that the shape and dimensions of the pellets are not critical to the present invention and that pellets of any suitable shape and dimensions may be used as desired, by one wishing to practice the process of the present invention.

When cylindrical pellets of catalyst of the type described above are used, the weighted hourly space velocity may be varied within wide limits (e.g., 0.1 to 5 w/hr/w) in order to obtain a desired rate of conversion, as explained above. Normally, space velocities of about 0.5 to 2 w/hr/w will be employed.

Catalyst life is an important factor in conducting a continuous reaction. For example, if a catalyst is easily poisoned, or if catalyst pellets do not have good structural properties, the economics of the process will be seriously and adversely affected.

The catalysts of the present invention are not particularly susceptible to poisoning so this normally does not present a problem. However, under the reaction conditions employed, amines of the type used and formed herein have the potential capability of leaching or otherwise adversely affecting the structural integrity of the pellets. In an extreme instance, catalyst pellets having good initial crush strength and surface hardness will be reduced to fines very rapidly when used under reaction conditions such as those employed herein.

As a consequence, the catalyst compositions of the present invention are advantageously used for a continuous process for the continuous production of essentially linear polyethylenepolyamine reaction products from monoethanolamine and ethylenediamine. As shown herein, such catalyst compositions can be used for prolonged periods without the need for regeneration. Thus, in Example IV it is shown that a representation catalyst of the present invention was used for over 2,000 hours with good results. Nevertheless, with the passage of time deactivation will tend to slowly occur. Deactivation can be measured qualitatively as the increase of temperature required to maintain an essentially constant conversion rate for the monoethanolamine and ethylenediamine.

When a catalyst composition of the present invention has become deactivated, or at least partially deactivated, in the sense that the temperatures required to maintain a desired conversion level is considered to be excessive, the catalyst may be regenerated with ease with oxygen under controlled regeneration conditions as disclosed in Vandepool U.S. Pat. No. 4,540,822.

The minimum regeneration temperature is the temperature required, for the catalyst employed, both to burn impurities from the catalyst and to again thermally activate the catalyst. This can be determined experimentally (see Example IV-B) and is normally in excess of 400° C. (e.g., 450° C.). The maximum regeneration temperature is the temperature at which the catalyst employed is thermally deactivated. The better practice is to use a temperature well below the deactivation temperature range of about 700° C. to 900° C (e.g., 550° C.).

Pure oxygen can be used, but it is preferably used in a concentration of about 1 to 20%, the balance being an inert gas (e.g. nitrogen, flue gas, etc). The catalyst bed is preferably preconditioned with a lean regeneration gas (e.g., 1–3% oxygen) for about 0.5 to 5 hours (e.g., 1–2 hours). Thereafter the oxygen concentration in the regeneration gas can be progressively increased or increased in stages to a concentration of from about 3% to about 20% oxygen while adjusting the temperature, if desired, to a temperature within the range of about 45020 to 550° C. The oxygen treatment may be continued in this fashion suitably for about 2 to 10 hours. Thereafter the catalyst bed is flushed with an inert gas until it is cooled and it may then be restored to service.

The catalyst compositions of the present invention are prepared from a pelleted oxide of a group IVb transition metal. The group IVb transition metal oxides include the oxides of titanium, zirconium, hafnium and thorium.

The catalyst composition is prepared by impregnating a preformed pellet. Any appropriate pelleting procedure of the type known to those skilled in the art may be used. For example, a powdered group IVb metal oxide can be mixed with graphite and/or other binders and compacted or extruded under conventional conditions.

The other starting material is a water soluble phosphorus compound containing hydroxyl groups and phosphorusoxygen bonds. Preferably an aqueous solution containing about 10 to about 85 wt%. of an acid of phosphorus, such as phosphoric acid, phosphorus acid, polyphosphoric acid, etc., is used. However, other liquid phosphorus compounds such as phosphoryl chloride ($POCl_3$), phosphorus halides, such as phosphorus bromide, alkyl phosphates and alkyl phosphites such as trimethyl phosphate, triethyl phosphate, trimethyl phosphite, triethyl phosphite, etc. may be utilized. Also, a diaminohydrogen phosphate such as diammonium hydrogen phosphate, $(NH_4)_2HPO_4$, dimethyldiamino hydrogen phosphate, $(CH_3)_2NH.PO_4$, diethylaminophydrogen phosphate $(CH_3CH_2)_2NH.PO_4$, etc. may be used.

As a matter of convenience, the normal practice is to use only one chemical as a phosphorus source (e.g., aqueous phosphoric acid). However, mixtures of two or more such reagents may be used, if desired.

The first step in the process of the present invention is an impregnation step wherein the pellets of the group IVb metal oxide are immersed in the aqueous solution of the phosphorus compound by an appropriate procedure (described hereafter) at an appropriate temperature, such as ambient temperature (e.g., 20°-30° C.) or a higher temperature, such as a temperature at or above the boiling point of the aqueous solution of the phosphorus compound (e.g., 100° to 150° C.). Temperatures below ambient temperature may be used, if desired, but no particular advantage is obtained by cooling the aqueous solution of the phosphorus compound for the impregnation step. However, temperatures between ambient temperature and the boiling point of the aqueous solution of the phosphorus compound can be used, if desired. Thus, the appropriate impregnation temperature range that will normally be used is from about 20° to about 150° C.

Immersion time is not critical, but the pellets should be immersed long enough for the aqueous solution to impregnate at least the outer porous surface (and more preferably, the entire porous structure) of the pellets. Normally, then, a minimum immersion time at ambient temperature or at temperatures between ambient temperature and the boiling point of the aqueous solution will be about 1 minute and, more preferably, about 2 to about 5 minutes.

After immersion, the pellets are removed from the aqueous solution of the phosphorus compound and allowed to drain.

It has been discovered in accordance with the present invention that immersion of the pellets in the aqueous solution will cause a portion of the phosphorus compound to adhere to the pellets, such that the impregnated pellets will now contain from about 0.5 to about 6 wt. % of phosphorus.

When the pellets are immersed and drained at a temperature below about 100° C., the phosphorus is not "fixed" to the pellets and can be removed (e.g., by washing the pellets with water). Therefore, a heating step is necessary to permanently chemically bond the phosphorus to the group IVb metal oxide and the heating step is preferably a calcining step (hereafter described in greater detail) because calcination is necessary in order to stabilize the pellets. However, if desired, an intermediate heating step conducted at about 100° to about 200° C. for about 0.5 to about 5 hours may be conducted in order to thermally, chemically bond the phosphorus to the group IVb metal oxide. Calcination will occur when the impregnated pellets are heated at or above about 200° C.

Another procedure to be used is to heat a neat undiluted solution of the phosphorus compound to a temperature of about 100° to about 150° C. and to then add the pellets in an amount about equal to the volume of the heated liquid. This treatment should be continued from about 0.5 to about 5 hours, depending upon the phosphorus compound used. At the end of that time, the resulting mixture of pellets and liquid is cooled, decanted to remove excess liquid followed by washing with an amount of water adequate to substantially completely remove unadsorbed liquid.

It has been further discovered in accordance with the present invention that the immersion and chemical bonding steps, just described, result in a composition consisting essentially of a group IVb metal oxide pellets having from about 0.5 to about 6 wt. % of phosphorus thermally, chemically bonded to at least the surface thereof.

It will be understood that the phosphorus that is present on a thus-treated pellet is not present as elemental phosphorus, but rather as phosphorus that is chemically bound, normally as an oxide, to the group IVb metal oxide support. This is demonstrated by the fact that repeated washing will not remove all of the phosphorus. The exact nature of the bonding is not completely understood.

However, the catalyst compositions of the present invention can be characterized as compositions composed of a pelleted group IVb transition metal oxide having from about 0.5 to about 6 wt. % of phosphorus chemically bonded to the surface thereof through group IVb transition metal-oxygen bonds in the form of hydroxy-containing phosphate groups. If all of the P—O+ valence bonds are chemically interconnected with the group IVb transition metal oxide, the resultant composition will be essentially inert insofar as activity for catalyzing the reaction of monoethanolamine with ethylenediamine is concerned.

As discussed hereafter, in accordance with a preferred embodiment of the present invention, the group IVb transition metal oxide is titania to which is thermally chemically bonded titanium triphosphate, $HTi_2(PO_4)_3$, a new form of titanium phosphate discovered and reported for the first time in the literature herein. In this embodiment, the titanium triphosphate can be present as a hydroxy-containing titanium phosphate having formula 1, 2 or 3:

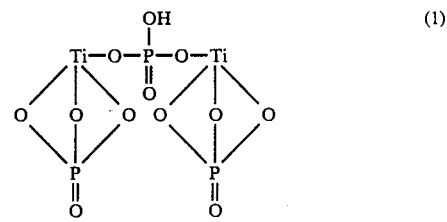 (1)

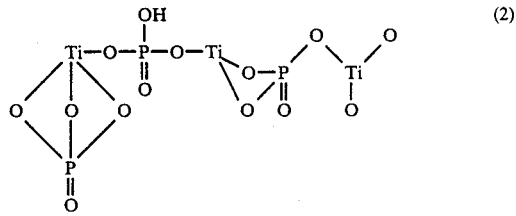 (2)

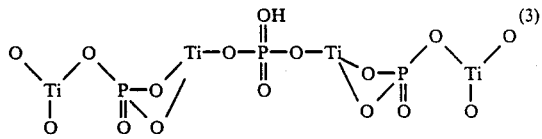 (3)

The amount of phosphorus that is bonded to the support is a function of heating and other conditions used in the treating step and is also a function of the chemical identity of the phosphorus compound that is used as a source of phosphorus. Under the treating conditions exemplified above, at least about 0.5 wt % of phosphorus is caused to bond or otherwise permanently adhere to the pellets. There is an upper limit to the amount of phosphorus that bonds or otherwise permanently adheres to the support. This upper limit is, as indicated, a function of both the treating conditions and the chemical used as a source of the phosphorus. Normally, not more than about 6 wt. % of phosphorus can be caused to bond to the pellets.

The pelleted catalyst compositions of the present invention should be calcined. They can be calcined prior to use or calcined in situ when used as catalysts at temperatures in excess of about 200° C. When the catalysts are to be calcined prior to use, calcination is suitably conducted for 2 to 24 hours at a temperature of 200° C. but below the temperature at which thermal destruction of the phosphorus bonding occurs. This can be determined experimentally for a particular catalyst (e.g., Example IV-B). Temperatures above 900° C. should be avoided. A suitable calcining temperature range is normally 200° to 800° C. and, more preferably, 300° to 600° C.

In any event, in-situ calcining will occur when the pelleted compositions are used to catalyze the reaction of monoethanolamine with ethylenediamine at 250° to 450° C.

There are many compounds which can be formed from the reaction of ethylenediamne and monoethanolamine besides the preferred linear polyethylenepolyamines such as diethylenetriamine, triethylenetetramine, tetraethylenepentamine and pentaethylenehexamine. Less desirable cyclics and other compounds, such as piperazine, N-(2-aminoethyl)ethanolamine and N-(20aminoethyl)piperazine, are also formed. The more desired linear polyethylenepolyamines can be easily recovered from the reaction product mixture by conventional methods such as distillation. Such distillation recovery methods are well known in the art. An outstanding advantage of the claimed invention is that the lower molecular weight polyethylenepolyamines recovered from the reaction mixture can be further reacted with monoethanolamine to produce a larger percentage of the higher molecular weight linear polyethylenepolyamines.

The following examples will further illustrate the preparation of predominantly linear polyethylenepolyamines from ethylenediamine and monoethanolamine by the use of the catalyst compositions of the present invention. They are given by way of illustration and not as limitations on the scope of the invention. Thus, it will be understood that reactants, proportions of reactants, and time, temperature and pressure of the reaction steps may be varied with much the same results achieved.

For purposes of convenience and brevity, the reactant compounds employed and the products obtained have been abbreviated in the following examples and tables. The abbreviations employed for these various compounds are:

EDA—ethylenediamine
MEA—monoethanolamine
PIP—piperazine
DETA—diethylenetriamine
TETA—triethylenetetramine
TEPA—tetraethylenepentamine
AEEA—N-(2-aminoethyl)ethanolamine
AEP—N-(2-aminoethyl)piperazine
HEP—N-(hydroxyethyl)piperazine.

EXAMPLE I-A

I-A

Titania Catalyst Preparation

A series of pelleted catalysts were prepared by depositing phosphorus on a titania support.

a. Phosphoric Acid

Titania supported phosphoric acid catalysts were prepared by heating about 100 cc of concentrated phosphoric acid containing about 85 wt. % of acid to about 130° C. under an inert atmosphere in a flask fitted with a condenser. 105 cc of titania pellets were slowly added through the condenser and the temperature was maintained for the desired period of time. This corresponds to the use of about 185 grams of phosphoric acid and about 115–125 grams of titania.

b. Phosphoryl Chloride on Titania

When using phosphoryl chloride as the source of phosphorus, a slight modification of the above identified procedures was necessary. The phosphoryl chloride was refluxed at 105° C. The heat was turned off and the reflux was maintained by the addition of titania pellets at a rate sufficient to maintain a strong reflux. Thereafter, heat was used to maintain the temperature.

Thereafter the catalyst was recovered by first decanting the excess phosphoryl chloride followed by the addition to the pellets of a large quantity of water.

When the resulting reaction mixture was thus treated with water the phosphoryl chloride was hydrolysed. The pellets and water were slowly stirred to dissipate heat. The pellets were washed several times with copious amounts of water and dried. Constant stirring was very important in order to maintain good heat dissipation. Phosphorus bromide was also used as a source of phosphorus using the procedure outlined above for phosphoryl chloride.

For convenience, the catalysts prepared and a brief description of the same is set forth herein as Tables I and I-A.

TABLE I

TITANIA CATALYST COMPOSITIONS

| Type | Number | Composition |
|---|---|---|
| A | 5464-72 | 40 wt. % Phosphate on alumina |
| A | 5494-4 | Titania (TiO$_2$) |
| A | 5494-16 | Titania treated with phosphoric acid (H$_3$PO$_4$) for ½ hour |
| A | 5494-5 | Titania treated with phosphoric acid for 2 hours |
| A | 5494-17 | Titania treated with phosphoric acid for 12 hours |
| A | 5494-95 | Titania treated with phosphoric acid for 2 hours |
| A | 5494-96 | Titania treated with phosphoric acid for 4 hours |
| B | 5494-6 | Titania treated with phosphoric acid for 2 hours and then calcined at 600° C. for 16 hours |
| B | 5494-65 | Titania treated with phosphoric acid, pelleted and then calcined at 600° C. for 16 hours |
| C | 5494-11 | Titania treated with phosphoric acid, aluminum nitrate (Al(NO$_3$)$_3$) then calcined at 600° C. for 16 hours |
| C | 5494-76 | Titania treated with phosphoric acid, aluminum nitrate and then calcined at 600° C. for 16 hours |
| C | 5494-77 | Titania treated with phosphoric acid, aluminum nitrate and then calcined at 600° C. for 16 hours |
| D | 5494-13 | Titania treated with phosphoryl chloride (POCl$_3$) for 4 hours |
| D | 5494-23 | Titania treated with phosphoryl chloride for 4 hours and then calcined at 600° C. for 16 hours |
| D | 5494-31 | Titania calcined at 600° C., then treated with phosphoryl chloride and recalcined at 600° C. for 16 hours |
| E | 5494-19 | Titania treated with phosphorous acid (H$_3$PO$_3$) for 2 hours |
| E | 5494-78 | Titania treated with phosphorous acid for 2 hours and then calcined at 600° C. for 16 hours |
| F | 5494-18 | Titania treated with polyphosphoric acid (PPA) for 2 hours |

TABLE I-A

TITANIA CATALYST COMPOSITIONS

| Type | Number | Composition |
|------|--------|-------------|
| F | 5494-87 | Titania treated with polyphosphoric acid for 2 hours and then calcined at 600° C. for 16 hours |
| G | 5494-20 | Titania treated with phosphorus bromide (PBr₃) for 2 hours |

EXAMPLE I-B

I-B

Preparation of Polyethylenepolyamines from Ethylenediamine and Monoethanolamine Using Titania Supported Phosphorus Catalysts The catalysts described in Tables I and I-A were utilized for the conversion of ethylenediamine and monoethanolamine to a polyethylenepolyamine reaction product in a 100 cc continuous reactor system. Pellets were placed in the reactor and the feedstock that was fed to the reactor was a mixture of ethylenediamine and monoethanolamine in a molar ratio of about two moles of ethylenediamine per mole of monoethanolamine.

In order to obtain a basis for comparison, the reaction temperature was varied so as to obtain about a 65% conversion of the monoethanolamine feedstock.

The reaction product was periodically sampled and analyzed by gas chromatographic analysis of the crude reactor effluent. Results were calculated on a feed-free basis.

The catalysts tested and the results obtained in the series of tests are set forth in Tables II-A and II-B. In general, each feedstock was run for at least 2½ hours to make sure that reaction conditions had stabilized.

Referring now to Tables II-A and II-B it will be seen that the reference catalyst composition (5464-72) which comprised a commercially available 40 wt. % phosphate on alumina catalyst of the type disclosed in Brennan U.S. Pat. No. 4,103,087 at column 8, lines 50-54 gave results which were improved upon in all instances. This run shows that with a pelleted aluminum phosphate catalyst, and in a continuous reaction, the results obtained are not so favorable as those reported for batch reactions in U.S. Pat. No. 4,448,997.

In particular, note that only about 77% of the triethylenetetramine fraction was noncyclic with this run. In contrast, with the catalyst of the present invention the noncyclic content was normally in excess of 90%. Note also that there was also a significantly smaller yield of diethylenetriamine with the reference catalyst.

The second reference catalyst (5494-4) was untreated titania pellets and it is seen that they were essentially inert insofar as conversion of monoethanolamine and ethylenediamine is concerned.

The type A titania supported catalysts wherein the source of phosphorus was phosphoric acid gave uniformly good results. Essentially equivalent results were obtained with the type B catalyst, however, the pellets were not quite so strong. The same comment applies to type C catalysts wherein the support was treated with phosphoric acid and thereafter there was an additional treatment with aluminum nitrate. The best pellet strength was obtained with the type D catalyst based on phosphoryl chloride.

Thus, Tables II-A and II-B demonstrate that with titania supported pelleted catalyst in a continuous reaction system, it is possible to obtain excellent results in the reaction of monoethanolamine with ethylenediamine. The percentage of noncyclic reaction products is very high, being over 90% in all cases except for type G (when phosphorus bromide was the source of phosphorus). Diethylenetriamine yields of from about 50 to about 70% were obtained with this group of catalysts. Uniformly good yields of triethylenetetramine were also obtained.

TABLE II-A

TITANIA SUPPORTED PHOSPHOROUS CATALYSTS

| Catalyst | Temp., 0° C., @ 65% MEA Conv. | Selectivity | | | | | | Ratio: DETA PIP | TETA % N.C. |
|----------|---|---|---|---|---|---|---|---|---|
| | | PIP | DETA | AEEA | AEP & HEP | TETA | TEPA | | |
| 5464-72 | 333 | 6.7 | 38.5 | 2.6 | 4.5 | 18.3 | 5.9 | 7.7 | 77 |
| 5494-4 | — | — | — | — | — | — | — | — | — |
| 5494-16 | 331 | 2.6 | 61.8 | 0.5 | 1.6 | 18.0 | ~3 | 23.5 | 96 |
| 5494-5 | 328 | 2.7 | 59.2 | 0.6 | 2.3 | 19.5 | 4.5 | 23.5 | ~95 |
| 5494-17 | 306 | 2.2 | 52.9 | 0.6 | 1.8 | 18.5 | 3.4 | ~24 | 97 |
| 5494-95 | 331 | 2.5 | 49.2 | ~0.5 | 2.3 | 17.8 | 2.8 | | 94 |
| 5494-96 | 333 | 2.5 | 57.3 | | 1.9 | 15.8 | ~1 | ~25 | 97 |
| 5494-6 | 325 | 2.8 | 59.0 | 0.7 | 2.1 | 19.6 | 4.2 | 19.7 | 96 |
| 5494-65 | 301 | 3.8 | 64.4 | 0.5 | 3.7 | ~20.5 | 2.5 | 17.0 | 92 |
| 5494-11 | 340 | 3.2 | 56.1 | 0.5 | 2.3 | 18.9 | 4.0 | 17.4 | 95 |
| 5494-76 | ~337 | ~2.6 | ~54.6 | ~1.1 | — | 18.8 | ~2 | | 97 |
| 5494-77 | 331 | 2.8 | 53.6 | 0.6 | 2.5 | 17.8 | 1.8 | 17.0 | 97 |
| 5494-13 | 311 | 2.4 | 65.9 | 0.3 | 2.1 | 19.0 | >2.5 | 25.2 | 95 |
| 5494-23 | 314 | 2.3 | 66.3 | 0.4 | 1.8 | 19.6 | 3.5 | 27.2 | 96 |
| 5494-31 | 323 | 2.4 | 59.2 | 1.2 | 1.7 | 18.2 | 3.0 | 29.7 | 97 |
| 5494-19 | 311 | 2.3 | 70.0 | 0.3 | 1.6 | 17.7 | 2.3 | 29.5 | 97 |
| 5494-78 | 328 | 2.3 | 69.8 | 0.3 | 2.3 | 19.6 | 3.4 | | 97 |
| 5494-18 | 309 | 2.5 | 64.0 | 0.5 | 1.8 | 16.8 | ~3 | 25.5 | 96 |
| 5494-87 | 334 | ~3 | ~73 | 0.8 | ~3 | ~20 | | | ~98 |
| 5494-20 | 325 | 5.0 | 54.4 | | 5.9 | 18.7 | 4.7 | 10.3 | 83 |

TABLE II-B

TITANIA SUPPORTED PHOSPHORUS CATALYSTS

| Catalyst | Cat. Type | Phosphorus on Cat. (wt. %) | Pellet* Strength |
|----------|-----------|---------------------------|------------------|
| 5464-72 | | | |
| 5494-4 | | | |
| 5494-16 | A | 2.2 | 14 |
| 5494-5 | A | 1.9/2.2 | 16 |
| 5494-17 | A | 1.6/2.2 | 10 |
| 5494-95 | A | | |
| 5494-96 | A | | |

TABLE II-B-continued
TITANIA SUPPORTED PHOSPHORUS CATALYSTS

| Catalyst | Cat. Type | Phosphorus on Cat. (wt. %) | Pellet* Strength |
|---|---|---|---|
| 5494-6 | B | 2.1 | 5 |
| 5494-65 | B | | |
| 5494-11 | C | 1.3 | 6.7 |
| 5494-76 | C | 2.1 | 9.7 |
| 5494-77 | C | 2.1 | |
| 5494-13 | D | 5.3 | 12.7 |
| 5494-23 | D | 6.5 | 18 |
| 5494-31 | D | | 9.7 |
| 5494-19 | E | 3.8 | 9.3 |
| 5494-78 | E | 5.2 | 7.3 |
| 5494-18 | F | 2.4 | 11.6 |
| 5494-87 | F | 2.3 | 5.0 |
| 5494-20 | G | | |

*Pounds per square inch after 1000 hours on stream.

Analysis of Catalyst Pellets

In an attempt to obtain a better understanding of the catalytic phenomena involved, three of the catalyst compositions of Table II were subjected to a detailed analysis utilizing a scanning electron microscope (SEM).

The results of the first series of analyses is given in Table III attached. Note that with catalyst 5494-6, the phosphorus was concentrated in the initial 50 microns of the pellet surface.

In addition, the exterior surface at the end of the pellet was also analyzed and the results of this analysis are set forth in Table IV.

In respect of catalyst 5494-11, wherein the titania was treated with aluminum nitrate and phosphoric acid and then calcined, and analysis of the interior of the surface is given in Table V.

The scanning electron microscope analysis of the surface of catalyst 5494-11 is given in Table VI.

TABLE III
Analysis of $H_3PO_4/TiO_2/Calcined$ (5494-6)
Interior Surface of Fractured Pellet
Weight % of Detected Elements

| Element | Outer Edge | 39 μin. | 50 μin. | 100 μin. | Center | 50 μin From Opposite Side | 10 μin From Opposite Side |
|---|---|---|---|---|---|---|---|
| Na | 2.4 | 0.7 | 0 | 0 | 0 | 0 | 1.5 |
| Al | 2.7 | 1.9 | 0 | 0 | 0 | 0 | 0 |
| Si | 3.4 | 1.5 | 0 | 0 | 0 | 0 | 0 |
| P | 35.3 | 10.8 | tr | tr | 0.2 | 0 | 20.4 |
| Cl | 5.3 | 2.1 | 0 | 0 | 0 | 0 | 0 |
| K | 7.3 | 2.0 | 0 | 0 | 0 | 0 | 0 |
| Ca | 1.9 | 1.6 | 1.5 | 0.9 | 2.0 | 2.0 | 0.5 |
| Ti | 41.7 | 79.3 | 98.5 | 99.1 | 97.8 | 98.0 | 77.6 |
| | 100.0 | 99.9 | 100.0 | 100.0 | 100.0 | 100.0 | 100.0 |

Above data indicate that the phosphorus is concentrated at the surface of the catalyst pellet in a layer less than 50 microns thick.

TABLE IV
Analysis of $H_3PO_4/TiO_2/Calcined$ (5494-6), Continued
Exterior Surface (End) of Pellet
Concentration, Weight % of Detected Elements

| Element | 1 | 2 | 3 | 4 | 5 | 6 | 7 |
|---|---|---|---|---|---|---|---|
| Na | 1.1 | 0.8 | 0.9 | 0.6 | 1.0 | 1.1 | 0.8 |
| Al | 0.1 | 0.2 | 0.7 | 0.1 | 3.2 | 3.3 | 0.2 |
| Si | 1.4 | 1.2 | 1.6 | 1.1 | 2.8 | 3.0 | 1.7 |
| S | 0 | 0 | 0 | 0 | 0 | 0 | 1.2 |
| Cl | 0 | 0 | 0 | 0 | 0 | 0 | 0.8 |
| K | 0 | 0 | 0 | 0 | 0 | 0 | 1.2 |

TABLE IV-continued
Analysis of $H_3PO_4/TiO_2/Calcined$ (5494-6), Continued
Exterior Surface (End) of Pellet
Concentration, Weight % of Detected Elements

| Element | 1 | 2 | 3 | 4 | 5 | 6 | 7 |
|---|---|---|---|---|---|---|---|
| Ca | 0 | 1.0 | 0.5 | 0.5 | 3.7 | 3.1 | 0.8 |
| Ti | 66.3 | 68.6 | 67.1 | 72.1 | 61.3 | 60.5 | 62.0 |
| P | 31.0 | 28.2 | 29.3 | 25.5 | 27.9 | 29.0 | 31.3 |
| | 99.9 | 100.0 | 100.1 | 99.9 | 99.9 | 99.9 | 100.0 |

Above data indicate that the phosphorus concentration is relatively constant across the exterior surface of the pellet.

TABLE V
Analysis of $H_3PO_4/TiO_2/Al(NO_3)/Calcined$
Sample No. 4 (5494-11)
Interior Surface (Fractured) of Pellet
Concentrations, Wt % of Detected Elements

| Element | 1 | 2 | 3 |
|---|---|---|---|
| Al | 2.5 | 0.88 | 1.5 |
| P | 1.7 | 0 | 0 |
| Ca | 1.2 | 0.82 | 1.5 |
| Ti | 94.6 | 98.3 | 97.0 |
| | 100.0 | 100.0 | 100.0 |

Edge of fractured pellet was very rough, so that the closest analysis to the edge was 7 microns away. At this location, the "P" concentration was very low. Comparing this with data in Table VI, it is evident that the phosphorus exists within a very thin surface layer, much thinner than that for $H_3PO_4/TiO_2/calcined$, and that the "P" concentrations are lower than those for the $H_3PO_4/TiO_4/calcined$ catalysts.

TABLE VI
Analysis of $H_3PO_4/TiO_2/Al(NO_3)_3/Calcined$
Sample No. 4 (5494-11), Continued
Exterior Surface (End Face) of Pellet
Concentration, Weight % of Detected Elements

| Element | 1* | 2 | 3 | 4 | 5 | 6 | 7 |
|---|---|---|---|---|---|---|---|
| Na | 0 | 0 | 0 | 0 | 0.4 | 0.3 | 0.1 |
| Al | 0 | 1.0 | 1.2 | 1.9 | 1.5 | 1.2 | 1.1 |
| Si | 0 | 0.4 | 0.4 | 0 | 0 | 0 | 0 |
| P | 5.3 | 12.5 | 10.8 | 12.5 | 15.8 | 10.0 | 12.9 |
| Ca | 0 | 0.5 | 0.6 | 1.0 | 0.8 | 0.2 | 0.7 |
| Ti | 94.7 | 85.6 | 87.0 | 84.7 | 81.6 | 88.3 | 85.3 |
| | 100.0 | 100.0 | 100.0 | 100.1 | 100.1 | 100.0 | 100.1 |

*Values suspect

The above data indicate that "P" concentrations are relatively constant across the end surface of the pellet. No reason can be offered for the low value on analysis #1. All "P" concentrations are lower than those for the $H_3PO_4/TiO_2/calcined$ catalysts.

In the case of the preceding analysis, it was demonstrated that the phosphorus was concentrated near the surface of the pellet. When catalyst 5494-13 was analyzed using the scanning electron microscope, different results were obtained, as is shown by Table VII.

TABLE VII
Analysis of $POCl_3/TiO_2$
Sample No. 5 (5494-13)
Interior (Fracture) Surface of Pellet
Concentration, Wt % of Detected Elements

| Element | 1 | 2 | 3 | 4 | 5 |
|---|---|---|---|---|---|
| Si | 0.3 | 1.5 | 0.6 | 1.0 | 0.7 |
| P | 6.8 | 8.2 | 7.2 | 8.7 | 8.5 |
| Cl | 0.6 | 0.8 | 1.1 | 1.2 | 1.2 |
| K | 0.1 | 0 | 0 | 0 | |
| Ca | 0.9 | 0.6 | 0.4 | 0.6 | 0.5 |
| Ti | 91.4 | 89.0 | 90.7 | 88.5 | 89.2 |
| | 100.1 | 100.1 | 100.0 | 100.0 | 100.1 |

The above data indicate that the "P" concentration is approximately constant throughout the bulk of the catalyst particle, rather than being limited to a thin layer at the surface as in $H_3PO_4/TiO_2/calcined$ and $H_3PO_4/TiO_2/Al(NO_3)_3/calcined$.

Further, when the exterior surface was analyzed, as set forth in Table VIII, it was found that the phosphorus was concentrated more in the interior of the catalyst than on the exterior. This demonstrates the need for caution when extrapolating from one catalyst composition to another in reactions of this nature.

TABLE VIII

Analysis of POCl₃/TiO₂
Sample No. 5 (5494-13) Continued
Exterior Surface (End) of Pellet

| Element | Concentration, Wt % of Detected Elements | | | | |
|---|---|---|---|---|---|
|  | 1 | 2 | 3 | 4 | 5 |
| Si | 0.1 | 0.4 | 0.3 | 0.6 | 0.5 |
| P | 3.7 | 6.3 | 4.5 | 6.1 | 6.6 |
| Cl | 1.8 | 1.1 | 24.7* | 0.7 | 1.1 |
| Ca | 0.8 | 0.8 | 0.4 | 0.7 | 0.6 |
| Ti | 93.7 | 91.5 | 70.1 | 91.9 | 91.2 |
|  | 100.1 | 100.1 | 100.0 | 100.0 | 100.0 |

*Value suspect
The above data indicate that "P" is distributed rather evenly across the exterior surface of the catalyst pellet, but is lower in concentration on the surface than inside the pellet. It is interesting that the lowest "P" concentration above corresponds to the lowest concentration within the pellet.

The catalyst compositions were also analyzed by X-ray defraction in bulk and after being powdered.

The results of the X-ray examination indicated that the titania that was used in a single phase, namely as anatase. Phosphating of the titania with phosphoric acid produced the well known compound $Ti(HPO_4)_2.2H_2O$. In addition, an unknown Ti-PO₄ compound was also detected. The X-ray defraction pattern was quite similar to that of three known triphosphates, namely $AgTi_2(PO_4)_3$, $BaFeTi(PO_4)_3$ and $GeNb(PO_4)_3$. Accordingly, the unknown was identified as a triphosphate possibly formed by the following reaction:

$$2TiO_2 + 2Ti(HPO_4)_3 \rightarrow 2HTi_2(PO_4)_3 + 2H_2O$$

Indexing of the unknown's pattern is given in Table IX, which follows:

TABLE IX

Indexing of Ti, PO₄ Unknown Pattern

| Intensity | d-Spacings, A | | Miller Indices |
|---|---|---|---|
|  | Obsd | Calculated[1] |  |
| w | 6.05 | 6.11 | (012) |
| w | 4.35 | 4.41 | (014) |
| w | 4.20 | 4.23 | (110) |
| m | 3.68 | 3.68 | (006) |
| s | 3.50 | 3.48 | (202) TiO₂ also |
| m | 3.32 | 3.29 | (106) |
| w | 3.22 | 3.16 | (007) |
| w | 3.03 | 3.05 | (024) |
| m | 2.75 | 2.75 | (211) |
| m | 2.03 | 2.04 | (036) |
| w | 1.95 | 1.96 | (128) |
| w | 1.83 | 1.84 | (0.0.12) |
| w | 1.60 | 1.60 | (140) |
| w | 1.28 | 1.28 | (514) |
| w | 1.25 | 1.25 | (3.1.14) |

[1]Calculated using 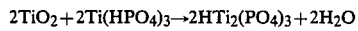, where hkl are Miller indices, a and c are lattice constants, 8.474 and 22.11A, respectively.

The X-ray defraction analysis studies further indicated that calcining converted essentially all of the $Ti(HPO_4)_2.H_2O$ to the new compound. The crystal size of the latter was determined to be about 125A. However, with respect to catalyst 5494-11 it was found that only a part of the $Ti(HPO_4)_2$ was converted to the new compound. The new compound was not detected in sample 5494-13.

The results obtained from the catalyst pellet analysis are extremely interesting in a number of respects. First, it is clearly demonstrated that when an aqueous solution of an acid of phosphorus is used new catalyst compositions are obtained, as in the case of the samples 5494-6 and 5494-11 which contain $HTi_2(PO_4)_3$. Otherwise the new phosphorus compound would not have been found.

Further, the superior activity obtained with a titania support is not solely attributable to the presence of the new compound as shown by the results obtained in Table II.

Finally, the interaction between the phosphorus and the titania support will vary depending upon the chemical nature of the source of the phosphorus but, again as shown by Table II, uniformly good results are obtained when titania is used as a catalyst support for a phosphorus containing compound.

EXAMPLE I-B

I-B

Titania Catalyst Preparation - (NH₄)₂HPO₄

A series of pelleted catalysts were prepared by depositing phosphorus on a titania support.

A flask containing 65.0 g of $(NH_4)_2HPO_4$, 150 cc of titania pellets and 50 cc of water was spun on a roto evaporator under aspirator pressure at room temperature for 2 hours. The contents of the flask were then poured onto a sieve and washed with a small amount of water. The wet pellets were then charged to a tubular furnace and dry nitrogen was passed through at ca. 50 cc/hr. The pellets were dried by heating the furnace to 60° C. for 3 hours, then to 80° C. for 1 hour and then to 90° C. overnight. The temperature of the furnace was then increased by 10° C. every 30–60 minutes until a temperature of 250° C. was reached. This temperature was maintained for 16 hours. Analysis of the resulting catalyst by atomic absorption indicated a phosphorus content of 4.3 wt %.

The catalyst was then placed in a 25 cc tubular continuous reactor system. A 2:1 (wt/wt) EDA/MEA feed was charged to the reactor at a space velocity of 1.0 g/cc-hr.

Data are presented below which compare the activity and product selectivity of this catalyst to a commerically available 40 wt % phosphate-on-alumina catalyst of the type disclosed in Brennan U.S. Pat. No. 4,103,087 at column 8, lines 50–54.

|  | Phosphate on Alumina | (NH₄)₂HPO₄/TiO₂ |
|---|---|---|
| Reaction temperature | 315° C. | 300° C. |
| % MEA Conversion | 39.9 | 43.5 |
| Selectivity to PIP | 4.6 | 2.3 |
| Selectivity to DETA | 59.9 | 68.4 |
| Selectivity to AEEA | 3.7 | 0.7 |
| Selectivity to AEP | 4.2 | 1.7 |
| Selectivity to TETA | 17.2 | 19.4 |
| Selectivity to TEPA | 2.1 | 3.2 |
| DETA/PIP ratio | 13.1 | 30.5 |
| % N.C. in TETA | 85.0 | 95.7 |

EXAMPLE I-C

I-C

Titania Catalyst Preparation - Trimethyl Phosphate

A titania support containing phosphorus was prepared by heating about 100 cc of trimethyl phosphate to about 130° C. under an inert atmosphere in a flask fitted with a condenser. About 100 cc of titania pellets were slowly added through the condenser and the temperature was maintained for four hours.

Thereafter the catalyst was recovered by first decanting the excess trimethyl phosphate followed by the addition to the pellets of a large quantity of water. The pellets and water were slowly stirred to dissipate heat. The pellets were washed several times with copious amounts of water and dried.

For convenience, the catalyst prepared and a brief description of the same is set forth herein as Table X.

TABLE X

TITANIA CATALYST COMPOSITIONS

| Number | Composition |
|---|---|
| 5464-72 | 40 wt. % Phosphate on alumina |
| 5494-4 | Titania (TiO$_2$) |
| (CH$_3$O)$_3$ PO | Titania treated with trimethyl phosphate for four hours |
| 5544-77 | Titania treated with triethyl phosphite for four hours |
| 5544-77d | Titania treated with triethyl phosphite and then calcined at 600° C. for 16 hours |

Preparation of Polyethylenepolyamines from ethylenediamine and Monoethanolamine Using Titania Containing Phosphorus Derived from Trimethyl Phosphate The catalysts described in Table X were utilized for the conversion of ethylenediamine and monoethanolamine to a polyethylenepolyamine reaction product in a 100 cc continuous reactor system. Pellets were placed in the reactor and the feedstock that was fed to the reactor with a mixture of ethylenediamine and monoethanolamine in a molar ratio of about two moles of ethylenediamine per mole of monoethanolamine.

In order to obtain a basis for comparison, the reaction temperature was varied so as to obtain about a 65% conversion of the monoethanolamine feedstock.

The reaction product was periodically sampled and analyzed by gas chromatographic analysis of the crude reactor effluent. Results were calculated on a feed-free basis.

The catalysts tested and the results obtained in the series of tests are set forth in Table X-A. In general, each feedstock was run for at least 2½ hours to make sure that reaction conditions had stabilized.

Referring now to Table X-A it will be seen that the reference catalyst composition (5464-72) which comprised a commercially available 40 wt. % phosphate on alumina catalyst of the type disclosed in Brennan U.S. Pat. No. 4,103,087 at column 8, lines 50-54 gave less satisfactory results than those obtained with the catalyst of the present invention. This run shows that with a pelleted aluminum phosphate catalyst, and in a continuous reaction, the results obtained are not so favorable as those reported for batch reactions in U.S. Pat. No. 4,448,997.

In particular, note that the reaction product contained less than 40% of diethylenetriamine while the reaction product formed using the catalyst of the present invention contained over 65% of diethylenetriamine.

The second reference tests (5494-4) was untreated titania pellets and it is seen that they were essentially inert insofar as conversion of monoethanolamine and ethylenediamine is concerned.

Thus, Table X-A demonstrates that with titania supported pelleted catalyst in a continuous reaction system, it is possible to obtain excellent results in the reaction of monoethanolamine with ethylenediamine. Diethylenetriamine yields of more than 65% were obtained. A good yield of triethylenetetramine was also obtained. This was particularly so in respect of the catalyst compositions were the source of the phosphorus was triethyl phosphite.

TABLE X-A

TITANIA SUPPORTED PHOSPHORUS CATALYSTS

| Catalyst | Phosphorus on Cat. (wt. %) | Temp., 0° C. @ 65% MEA Conv. | Selectivity | | | | | | Ratio: DETA/PIP | TETA % N.C. |
|---|---|---|---|---|---|---|---|---|---|---|
| | | | Pip. | DETA | AEEA | AEP & HEP | TETA | TEPA | | |
| 5464-72 | | 333 | 6.7 | 38.5 | 2.6 | 4.5 | 18.3 | 5.9 | 7.7 | 77 |
| 5494-4 | | — | — | — | — | — | — | — | — | — |
| (CH$_3$O)$_3$PO | | 300[1] | 1.8 | 66.6 | 0.4 | 1.3 | 14.5 | — | 37.0 | |
| 5544-77 | 1.58 | | 2.1 | 57.8 | 0.75 | 2.4 | 20.5 | 5.2 | 27.5 | 95 |
| 5544-77d | 1.96 | | 2.6 | 60.2 | 0.82 | 2.4 | 20.2 | 5.0 | 23.1 | 96 |

[1]Conversion was 58.8%, based on MEA

EXAMPLE I-D

I-D

Titania Catalyst Preparation - Rylander 21%P

A catalyst was prepared in accordance with the general instructions given in Rylander et al. U.S. Pat. No. 2,824,073, which issued Feb. 18, 1958. 200 cc (about 365 gr.) Concentrated phosphoric acid (85%) and 100 grams of titania were mixed together in a flask, heated to 125° C. for five hours; cooled; decanted to remove unreacted phosphoric acid; washed with water; dried and then calcined at 600° C. The resultant solid titanium phosphate contained about 21 wt. % phosphorus. The solid mass was broken into particles that would pass through a #8 mesh screen and be retained on a #10 mesh screen. The particles were used to catalyze the reaction of monoethanolamine with ethylenediamine at 300° C. in the manner described above in Example I-A.

However, the run had to be terminated after 24 hours because the catalyst particles had disintegrated to mush.

Analysis of the reaction product prior to termination of the run indicated an MEA conversion of about 70.7% with selectivities as follows:

| | |
|---|---|
| PIP | 4.8% |

-continued

| | |
|---|---|
| DETA | 53.8% |
| Ratio DETA/PIP | 11.20 |
| AEP | 9.5% |
| TETA | 21.0% |
| TEPA | 4.8% |

This experiment demonstrates that the pellets were not stable and further demonstrates that that catalyst did not provide the high selectivity to non-cyclic products shown in Table II-A.

EXAMPLE I-E

I-E

Titania Catalyst Preparation - Rylander 8.4%P

In order to further revaluate the efficacy of catalysts of the type disclosed in Rylander et al. U.S. Pat. No. 2,824,073, a second catalyst composition was prepared.

26 Grams of titania and 6.5 grams of polyphospho-ric acid in solution in 25 cc of water were mixed in an evaporating dish to form a paste which was spread out on the disk; heated for 2 hours at 300° C. and for 3 hours at 450° C. The resultant solid mass was broken up into particles smaller than about 5–10 microns that would not pass a 20 mesh screen.

EXAMPLE I-F

I-F

Catalytic Activity

The catalyst particles which were found by analysis to contain about 9.4 wt. % P. were used to catalyze the reaction of monoethanolamine with ethylenediamine in the manner described above in Example I-A.

The reaction was initiated at 270° C. and, during the first 10 hours of operation, the reaction temperature was raised by 10° C. at 2½ hour intervals. The reactor effluent was analyzed at each temperature level. The results are reported in Table XI. Since the MEA conversion peaked at 300° C., there was no advantage in further raising the temperature. However, the run was continued for an additional 260 hours (270 hours total run length). At the end of the run the catalyst was tested for crush strength, which was found to be only 1#/sq.in.

TABLE XI

Titania Supported Rylander et al. Type Catalyst

| Temp. °C. | MEA Conv. | Selectivities | | | |
|---|---|---|---|---|---|
| | | PIP | DETA | AEP + AEEA | TETA |
| 270 | 11.3 | — | 93 | — | — |
| 280 | 15.8 | — | 93.5 | — | 0.7 |
| 290 | 21.8 | 0.5 | 89.2 | 0.3 | 6.1 |
| 300 | 28.5 | 0.9 | 86.7 | 0.5 | 8.4 |
| 310 | 25.3 | 0.9 | 84.1 | 0.8 | 8.6 |

The results reported in Table XI show that the catalyst was a poor one for catalyzing the reaction of monoethanolamine with ethylene diamine because of the very low MEA conversions that were obtained. good selectivity to DETA and TETA is to be expected at the low conversions obtained and are not indicative of the selectivities that would be obtained at higher MEA conversions.

Rylander et al. U.S. Pat. No. 2,824,073 discloses a process for preparing reaction products of titania and triphosphoric acid that are stated to be useful for the polymerization of propylene. They are prepared by reacting 0.1 to 2 parts by weight of titania with triphosphoric acid at a temperature of 240° to 600° C. The patentees state that their materials are substantially identical with catalysts produced by the interaction of $TiCl_4$ with orthophosphoric acid and that a typical catalyst prepared from $TiO_2$ and commercial polyphosphoric acid (47.8 wt. % $H_5P_3O_{10}$) in 2:1 weight ratio was found to contain 21.3 wt. % of titanium and 25.6 wt. % of phosphorus.

Such a composition corresponds to that of $TiH_2P_2O_8$ which contains 20.0 wt. % of titanium and 25.8 wt. % of phosphorus.

$TiH_2P_2O_8$ has an X-ray diffraction pattern given by card 21-1232 from the file of X-ray diffraction patterns published by the American Society for Testing Materials and compiled by the JCPDS (Joint Committee on Powder Diffraction Standards).

A novel constituent of the catalysts of the present invention has been found by x-ray diffraction, as shown by Table IX, to be $HTi_2(PO_4)_3$. This compound has a titanium content of 25.1 wt. % and a phosphorus content of 24.3 wt. %. Such a composition is different from that of $TiH_2P_2O_8$ which is the active ingredient in U.S. Pat. No. 2,824,073, in that the following diffraction lines of $TiH_2P_2O_8$ given on ASTM card 21-1232 having $I/I_1$ of 50 or more, are not present in the X-ray pattern of $HTi_2(PO_4)_3$: 7.25, 3.98, 3.42, 2.47. 1.79, and 1.44A; and the following intense lines listed in Table IX, for $HTi_2(PO_4)_3$, those designated s or m, are not present in the X-ray pattern of $TiH_2P_2O_8$: 3.68, 3.50, and 3.32A ("s" means strong and "m" means medium intensity).

As indicated above, Rylander et al. prepare their compositions by reacting titania with triphosphoric acid ($H_5P_3O_{10}$) in the weight ratio of titanium dioxide (titania) to triphosphoric acid of 0.1 to 2. When titania and triphosphoric acid are used as starting materials for the preparation of the catalyst compositions of the present invention, the weight ratio of titania to triphosphoric acid in the final catalyst composition will be within the range of about 4 to about 70. For example, the calculated weight ratio of titania to polyphosphoric acid (calculated as triphosphoric acid) of catalyst 5494-18 of Table II-B is about 14.

EXAMPLE I-G

I-G

Modified Titania Catalyst Preparation

Four catalyst samples were prepared by immersing titania catalyst pellets in an aqueous solution of phosphoric acid (30% phosphoric acid) under ambient conditions of temperature and pressure. Thereafter, the catalyst pellets were drained and calcined for about 3 hours at a temperature of about 450° C.

The thus prepared catalyst samples and the Rylander catalyst of Example I-E were analyzed by elemental analysis, X-ray diffraction analysis, X-ray photoelectron spectroscopy and scanning electron microscopy.

X-ray Diffraction Examinations

Both powdered specimens and whole catalyst pellets were examined for each of the five catalyst samples. Powder specimens were prepared by dry grinding to −325 mesh and packing into a sample holder in the conventional manner. Whole pellets were mounted in a special sample holder by placing fifteen pellets upright and side-by-side into a bed of Apiezon Q ceiling compound. The protruding flat ends were levelled with each other and the sample holder surface by pressing down on the group of pellets using a microscope slide.

X-ray diffraction patterns were obtained for the five catalysts. Samples 64811 and 64827 exhibited very similar diffraction profiles to each other and to the catalyst of Example I-E. The peaks in both the powder and whole pellet speciments were assigned to anatase and rutile forms of titania. Samples 15-039A and 43-015A differed in surface and bulk composition from the previous three samples. These two samples contained titania only as the anatase form and contained a second crystalline phase of 26.6° two-theta which was concentrated on the catalyst surface. The surface with respect to this peak was principally titania matrix calculated at about 5 micrometers deep (maximum). The peak at 26.6° two-theta was assigned to the graphite form of carbon.

In addition to the phase compositional differences, the nature of the anatase crystallites in samples 15-039A and 43-015A was different, in comparison to each other and to the other three samples. The differences in the peak shape of the anatase peak reveal information about average crystallite size and size distribution. Thus, although anatase crystallites in samples 64811 and 64827 and Example I-E were very similar in average crystallite size, samples 15-039A and 43-015A exhibited greater overall peak broadening which is associated with smaller anatase crystallites in these materials. The latter two samples were distinguished by a nonuniform peak shape consisting of a broad halo superimposed with a sharp peak. This profile suggests a very wide anatase size distribution with large populations at both ends.

Phosphorus Distribution by Scanning Electron Microscopy

Pellets of catalyst 64811, 64827, 15-039A and 43-015A were fractured with a razor blade to expose the interior cross section. One portion of each of the fractured pellets was then mounted for analysis of the interior cross section (at the edge, midpoint and center) and the other half cemented on its side to the stub for analysis of the exterior. The chunky samples of catalyst I-E were placed so as to analyze glazed top surfaces, bottom surfaces and interior fracture surfaces.

Energy Dispersive X-ray Micro Analysis

EDX spectra were collected at appropriate points on the exterior and interior cross section surfaces, accumulating 5000 total counts at the centroid channel for the titanium K-alpha emission. The spectral response was then recorded manually for the aluminum, silican, phosphorus, sulfur and titanium emissions as well as appropriate background energies.

The net response for each element was later calculated by substracting its background contribution from the total count recorded in the centroid channel. For titanium, the spectral background point (base line type) was 5.50 keV which is most of the spectra accumulated a nominal 100 counts; because the phosphorus and sulfur emissions were superimposed on a nonlinear background and were not base line resolved, their backgrounds were estimated by projecting a decreasing linear tie line between the energies 1.72 and 2.50 keV which spends phosphorus and sulfur emissions. As a result of this estimate, certain net counts for sulfur generated by samples 64811 and 64827 and sample I-E were negative, affirming the absence of sulfur by another approach other than visual inspection of the spectrum.

The results are summarized in Tables XII-A through XII-E. As shown by Table XII-A, sample I-E exhibited the highest emission on both exterior and fracture surfaces. Sulfur was not detected in this sample. The other four samples consistently exhibited detectable phosphorus at all points within the interior and their average intensities are similar to those of the exterior surfaces.

TABLE XII-A

Sample I-E
Phosphorus & Sulfur Distribution by SEM

| Particle | Surface Analyzed | PKα Net 2.01 keV | SKα Net 2.30 keV | Ti Kα Net 4.51 keV | Counting Time, Sec |
|---|---|---|---|---|---|
| 1 | Smooth Bottom Surface PTCL @ 8 o'clock corner in Micrograph NK 5804 | 1274 | −87 | 5000 | 171 |
| 2 | Fracture Surface PTCL @ 4 o'clock corner | 856 | −3 | 4938 | 375 |
| 3 | Fracture Surface Airfoil Shaped PTCL @ 2 o'clock | 903 | −37 | 4929 | 202 |
| 4 | Glazed Knob PTCL @ 10 o'clock corner | 1179 | −74 | 4921 | 167 |

SEM/EDX will not detect elements below Z = 11 (sodium)

TABLE XII-B

64827
Phosphorus & Sulfur Distribution by SEM

| Extrudate | Surface Analyzed | PKα Net* 2.01 keV | SKα Net 2.30 keV | Ti Kα Net 4.51 keV | Counting Time, Sec |
|---|---|---|---|---|---|
| 1 | Edge of Fracture CS | 1006 | ** | 4907 | 117 |
| 1 | Midway of Fracture CS | 1015 | ** | 4944 | 262 |
| 1 | Center of Fracture CS | 896 | ** | 4944 | 158 |
| 2 | Exterior | 697 | ** | 5064 | — |
| 2 | Exterior | 843 | ** | 4986 | 84 |
| 2 | Edge of Fracture CS | 746 | ** | 4970 | 142 |
| 2 | Midway of Fracture CS | 648 | ** | 4937 | 106 |

TABLE XII-B-continued

64827
Phosphorus & Sulfur Distribution by SEM

| Extru-date | Surface Analyzed | PKα Net* 2.01 keV | SKα Net 2.30 keV | Ti Kα Net 4.51 keV | Counting Time, Sec |
|---|---|---|---|---|---|
| 2 | Center of Fracture CS | 738 | ** | 5058 | 101 |

SEM/EDX will not detect elements below Z = 11 (sodium)
*Net computed using average background (341) calculated for companion Norton catalyst.
**Not detected in spectrum.

TABLE XII-C

64811
Phosphorus & Sulfur Distribution by SEM

| Extru-date | Surface Analyzed | PK Net* 2.01 keV | SK Net 2.30 keV | Ti K Net 4.51 keV | Counting Time, Sec |
|---|---|---|---|---|---|
| 1 | Exterior | 669 | −17 | 4931 | 124 |
| 1 | Edge of Fracture CS | 1031 | −59 | 4911 | 115 |
| 1 | Edge (Opposite) | 796 | −55 | 4979 | 121 |
| 1 | Midway of Fracture CS | 557 | +1 | 4941 | 121 |
| 1 | Midway (Opposite) | 711 | −61 | 4919 | 122 |
| 1 | Center of Fracture CS | 428 | −52 | 4973 | 137 |
| 1 | Center (Repeat) | 530 | −12 | 4917 | 81 |
| 2 | Exterior | 930 | −44 | 4934 | 117 |
| 2 | Exterior | 835 | −34 | 4943 | 113 |
| 2 | Edge of Fracture CS | 679 | 0 | 4936 | 121 |
| 2 | Midway of Fracture CS | 622 | +25 | 4929 | 90 |
| 2 | Center of Fracture CS | 542 | +21 | 4989 | 81 |

SEM/EDX will not detect elements below Z = 11 (sodium)
*Net computed using average background (341) calculated for companion Norton catalyst.

TABLE XII-D

#43-015A
Phosphorus & Sulfur Distribution by SEM

| Extru-date | Surface Analyzed | PK Net* 2.01 keV | SK Net 2.30 keV | Ti K Net 4.51 keV | Counting Time, Sec |
|---|---|---|---|---|---|
| 1 | Exterior | 573 | 435 | 5158 | 165 |
| 1 | Edge of Fracture CS | 515 | 359 | 4940 | 163 |
| 1 | Midway of Fracture CS | 478 | 309 | 4936 | 156 |
| 1 | Center of Fracture CS | 522 | 417 | 5130 | 152 |
| 2 | Exterior | 339 | 449 | 4919 | 176 |
| 2 | Midway of Fracture CS | 275 | 416 | 4925 | 160 |
| 2 | Center | 223 | 375 | 4938 | 112 |
| 3 | Exterior | 387 | 344 | 4934 | 271 |

SEM/EDX will not detect elements below Z = 11 (sodium)
*Net computed using average background (341) calculated for companion Norton catalyst.

TABLE XII-E

#15-039A
Phosphorus & Sulfur Distribution by SEM

| Extru-date | Surface Analyzed | PK Net* 2.01 keV | SK Net 2.30 keV | Ti K Net 4.51 keV | Counting Time, Sec |
|---|---|---|---|---|---|
| 1 | Exterior | 218 | 405 | 4924 | 212 |
| 1 | Edge of Fracture CS | 153 | 377 | 4943 | 79 |
| 1 | Edge (Opposite) | 305 | 378 | 4916 | 79 |
| 1 | Midway of Fracture CS | 207 | 330 | 4914 | 129 |
| 1 | Center | 190 | 345 | 4922 | 137 |
| 2 | Exterior | 149 | 292 | 4912 | 81 |
| 2 | Edge of Fracture CS | 204 | 296 | 4924 | 120 |
| 2 | Midway of Fracture CS | 205 | 395 | 4924 | 144 |
| 2 | Center | 202 | 355 | 4968 | 96 |
| 3 | Exterior only | 211 | 420 | 4925 | 203 |

SEM/EDX will not detect elements below Z = 11 (sodium)
*Net computed using average background (341) calculated for companion Norton catalyst.

Characterization by X-ray Photoelectron Spectroscopy Samples 64827, 64811, 43-015A and Example I-E X-ray photoelectron spectroscopy detected Ti, O and P on the surfaces of the four samples tested. In addition, a substantial amount of sulfur was detected on sample 43-015A. In all cases titanium is characteristic of titanium oxide; however, the titanium on sample 43-015A appears to be of a different form than that found on the other samples. Phosphorus is consistent with phosphoric acid, possibly a singly deprotonated species. The chemical environment of the phosphorus species appears to be slightly different for each sample. The sulfur detected on sample 43-015A is probably present in the form of a sulfate.

The results are summarized in Table XII-A through Table XIII-D.

TABLE XIII-A

64827 Catalyst
X-Ray Anode is MG, HV = 1253.60 eV
CALCULATED SPECTROSCOPIC PARAMETERS

| Atom | Line | PBE | AKE | MAP | XAT | XWT |
|---|---|---|---|---|---|---|
| C | 1s | 284.70 | — | — | 0.090 | 0.049 |
| O | 1s | 530.50 | — | — | 0.662 | 0.474 |
| O | 1s | 531.10 | — | — | — | — |
| O | 1s | 533.05 | — | — | — | — |
| Ti | 2p3 | 459.15 | 413.4 | 872.5 | 0.176 | 0.377 |
| Ti | 2p1 | 464.90 | — | — | — | — |
| P | 2p | 134.15 | 1850.4 | 1984.5 | 0.072 | 0.100 |
| C | 1s | 285.10 | — | — | — | — |

TABLE XIII-B

64811 Catalyst
X-Ray Anode is MG, HV = 1253.60 eV
CALCULATED SPECTROSCOPIC PARAMETERS

| Atom | Line | PBE | AKE | MAP | XAT | XWT |
|---|---|---|---|---|---|---|
| C | 1s | 284.70 | — | — | 0.146 | 0.080 |
| O | 1s | 530.30 | — | — | 0.616 | 0.448 |
| O | 1s | 531.10 | — | — | — | — |
| O | 1s | 532.70 | — | — | — | — |
| Ti | 2p3 | 458.85 | 413.7 | 872.5 | 0.178 | 0.388 |
| Ti | 2p1 | 464.65 | — | — | — | — |
| P | 2p | 133.70 | 1851.1 | 1984.8 | 0.060 | 0.084 |
| C | 1s | 284.65 | — | — | — | — |

TABLE XIII-C 43-015A
X-Ray Anode is MG, HV = 1253.60 eV*
CALCULATED SPECTROSCOPIC PARAMETERS

| Atom | Line | PBE | AKE | MAP | XAT | XWT |
|---|---|---|---|---|---|---|
| C | 1s | 284.70 | — | — | 0.157 | 0.084 |
| O | 1s | 531.05 | — | — | 0.557 | 0.397 |
| O | 1s | 532.30 | — | — | — | — |
| Ti | 2p3 | 459.75 | 412.8 | 872.6 | 0.159 | 0.340 |
| Ti | 2p1 | 465.45 | — | — | — | — |
| P | 2p | 134.65 | — | — | 0.028 | 0.038 |
| S | 2p | 169.70 | — | — | 0.099 | 0.141 |
| C | | 284.70 | — | — | — | — |

*Flood on, 1 V energy, 1.5 microamps sample current note that a minimum of 1.0 microamps sample current was required to neutralize the sample charging artifacts.

TABLE XIII-D

Catalyst I-E
X-Ray Anode is MG, HV = 1253.60 eV
CALCULATED SPECTROSCOPIC PARAMETERS

| Atom | Line | PBE | AKE | MAP | XAT | XWT |
|---|---|---|---|---|---|---|
| C | 1s | 284.70 | — | — | 0.138 | 0.077 |
| O | 1s | 530.65 | — | — | 0.628 | 0.469 |
| O | 1s | 531.55 | — | — | — | — |
| Ti | 2p3 | 459.10 | 413.9 | 872.9 | 0.148 | 0.330 |
| Ti | 2p1 | 464.80 | — | — | — | — |
| P | 2p | 133.90 | 1851.0 | 1984.9 | 0.086 | 0.124 |
| C | | 284.75 | — | — | — | — |

Summary and Conclusions

The foregoing results are summarized in Table XIII. The main compositional differences among the samples may be summarized as follows:

Examples 43-015A and 15-039A stand out from the other three catalysts because they contain well distributed phosphorus and sulfur and contain less bulk phosphorus as compared to the other three samples. In the bulk, the anatase form of titania is their major crystalline component. Graphite is present as a minor constituent. Sample 15-039A was different in that it displayed a non-uniform anatase diffraction peak composed of a broad halo superimposed with a sharp peak, suggesting a wide crystallite size distribution with large populations at both ends.

The catalyst of sample I-E and samples 64827 and 64811 contain both the anatase and rutile forms of titania and have similar average crystallite sizes. Their crystallite concentrations at the surface are similar to those found in the bulk. These three catalysts, as compared to the other two catalysts, contain more phosphorus and show significant interior concentrations of phosphorus. Sulfur was not detected in these three samples.

The X-ray photoelectron spectroscopy work yielded titanium binding energy results characteristic of titanium oxide. The titanium on the surface of sample 43-015A appears to be in a different form than in the other samples.

Although there were individual differences in the five samples tested, as noted above, it appears that the same type of thermal-chemical bonding occurred in sample I-E as occurred in the other samples.

EXAMPLE I-H

I-H

Preparation of Polyethylenepolyamines

The catalyst samples were prepared by immersing titania pellets in an aqueous solution of phosphoric acid after which the pellets were recovered, drained, dried and calcined.

The eleven catalyst samples were then utilized for the conversion of ethylenediamine and monoethanolamine to a polyethylenepolyamine reaction product in a 100 cc continuous reactor system. Pellets were placed in the reactor and the feedstock that was fed to the reactor was a mixture of ethylenediamine and monoethanolamine in a molar ratio of about 2 moles of ethylenediamine per mole of monoethanol amine.

In order to obtain a basis for comparison, the reaction temperature was varied so as to obtain a 65% conversion of the monoethanolamine feedstock.

The reaction product was periodically sampled and analyzed by gas chromatographic analysis of the crude reactor effluent. The catalysts employed and the results obtained dare summarized in Table XIV.

TABLE XIV

Catalyst Screening

| Catalyst | 5834 | 65% MEA Conv.[a] | Selectivity[b] PIP | DETA | AEP | TETA | TEPA | DETA/ PIP[c] | % NC[d] |
|---|---|---|---|---|---|---|---|---|---|
| 64837 | −1 | 320 | 1.7 | 57 | 1.7 | 18.7 | 4.0 | 34 | 96 |
| 64842 | −2 | 321 | 1.8 | 64 | 2.1 | 17.4 | 2 | 36 | 97 |
| 64831 | −4R | 321 | 1.8 | 61.8 | 2.4 | 19.5 | 3–4 | 34 | 95 |
| 64843 | −5 | 322 | 1.8 | 65.1 | 2.4 | 19.5 | 2 | 36 | 95 |
| 64830 | −6 | 319 | 2.1 | 60.5 | >3 | 19.7 | 4.0 | 29 | 95 |
| 64841 | −7 | 328 | 1.9 | 64.0 | 2.3 | 19.7 | 2.6 | 34 | 96 |

TABLE XIV-continued

| Catalyst | 5834 | 65% MEA Conv.[a] | Catalyst Screening Selectivity[b] | | | | | DETA/ PIP[c] | % NC[d] |
|---|---|---|---|---|---|---|---|---|---|
| | | | PIP | DETA | AEP | TETA | TEPA | | |
| 37-043B | −3 | 289 | 1.8 | 67.5 | 2.5 | 19.5 | 1.3 | 37 | 97 |
| 43-015A | −8 | 292 | 2.1 | 61 | 3.0 | 19.8 | — | 29 | 94 |
| 37-061A | −9 | 291 | 1.8 | 64.6 | 2.6 | 20 | 2.5 | 36 | 96 |
| 43-053A | −12 | 306 | 3.7 | 53.0 | 6.2 | 19.8 | 5.3 | 14 | 82 |
| 92-012A | −44 | 304 | 2.3 | 70.5 | 2.0 | 21.0 | 3.7 | 31 | 97 |

[a] Temperatures (°C.) at which 65% MEA was obtained with each catalyst.
[b] Selectivity calculated on a lights and feed-free basis.
[c] The DETA/PIP ratio is an indicator of overall selectivity for the ethyleneamine process.
[d] % NC is the percentage of linear compounds in the TETA product fraction. This number has been used as an indicator of product quality for TETA & TEPA fractions.

EXAMPLE II

Zirconia Supported Phosphorus Containing Catalyst Compositions

A series of phosphorus containing zirconia supported catalyst compositions were prepared using the procedure outlined above in Example I-A. The pelleted catalysts were tested in the 100 cc continuous reactor described in Example I-B using the same conversion conditions. The catalyst compositions that were prepared are given in Tables XV-A and XV-B. The results obtained with this group of catalysts is set out in Tables XVI-A and XVI-B.

TABLE XV-A

| Type | Number | Zirconia Catalyst Compositions Composition |
|---|---|---|
| | 5464-72 | 40 wt % Phosphate on alumina |
| | 5484-37 | Zirconia |
| H | 5484-6 | Zirconia treated with 11 wt % phosphoric acid (H$_3$PO$_4$) for 1 hour at 125° C. |
| H | 5484-63 | Pelleted zirconia treated with phosphoric acid for 1 hour at 125° C. |
| H | 5484-17 | Zirconia treated with 22 wt % phosphoric acid for 1 hour at 125° C. |
| H | 5484-83 | Zirconia treated with 11 wt % phosphoric acid for 1 hour at 125° C. |
| H | 5484-84 | Zirconia treated with 11 wt % phosphoric acid for 2 hours at 125° C. |
| H | 5484-85 | Zirconia treated with 11 wt % phosphoric acid for 4 hours at 125° C. |

TABLE XV-A-continued

| Type | Number | Zirconia Catalyst Compositions Composition |
|---|---|---|
| H | 5494-71 | Zirconia treated with 11 wt % phosphoric acid for 24 hours at 125° C. |
| J | 5484-64 | No. 5484-63 calcined at 600° C. for 16 hours |
| J | 5484-29A | Zirconia treated with 10 wt % phosphoric acid for 1 hour at 125° C. and then calcined at 600° C. for 16 hours |
| J | 5484-56 | No. 5484-29A after 300 hours of reaction time |

TABLE XV-B

| Type | Number | Zirconia Catalyst Compositions Composition |
|---|---|---|
| J | 5484-46 | Zirconia treated with 15 wt % of phosphoric acid and then calcined for 16 hours at 600° C. |
| J | 5484-47A | Zirconia treated with 11 wt % of phosphoric acid for 1 hour at 125° C. and then calcined at 600° C. for 16 hours |
| K | 5494-79 | Zirconia treated with phosphorous acid (H$_3$PO$_3$) for 2 hours |
| L | 5494-83 | No. 5494-79 calcined at 600° C. for 16 hours |
| M | 5494-29 | Zirconia treated with phosphoryl chloride for 4 hours |
| N | 5494-30 | No. 5494-29 calcined at 600° C. for 16 hours |
| O | 5494-86 | Zirconia treated with polyphosphoric acid (PPA) for 2 hours |
| P | 5494-88 | No. 5494-86 calcined at 600° C. for 16 hours |
| Q | 5494-81 | Zirconia treated with phosphorus bromide for 2 hours |

TABLE XVI-A

Zirconia Supported Phosphorous Catalysts

| Catalyst | Temp, 0° C. @ 65% MEA Conv. | Selectivity | | | | | | Ratio: DETA PIP | TETA % N.C. |
|---|---|---|---|---|---|---|---|---|---|
| | | PIP | DETA | AEEA | AEP & HEP | TETA | TEPA | | |
| 5464-72 | 333 | 6.7 | 37.5 | 1.8 | 5.9 | 19.7 | 7.7 | 5.8 | 76 |
| 5484-37 | — | — | — | — | — | — | — | — | — |
| 5484-6 | 316 | 3.9 | 54.2 | 0.9 | 1.5 | 17.1 | 2.4 | 15.7 | ~96 |
| 5484-63 | 318 | 3.5 | 56.4 | 1.3 | 2.1 | 15.8 | — | 15.3 | |
| 5484-28 | 322.5 | 3.7 | 56.2 | 1.1 | 2.2 | 16.8 | 2.2 | 15.4 | |
| 5484-83 | 322 | 5.1 | 50.8 | 0.7 | 3.7 | 15.5 | 3.0 | 10.5 | |
| 5484-84 | 320 | 4.4 | 54.0 | 0.4 | 2.5 | 15.2 | 3.1 | 12.5 | |
| 5484-85 | 322 | 4.8 | 55.6 | 0.9 | 2.2 | 12.4 | 2.4 | 12.3 | |
| 5494-71 | 319 | 3.4 | 71.3 | 1.0 | 2.0 | 19.5 | ~2 | 17.0 | 96 |
| 5484-64 | 322 | 4.0 | 54.0 | — | 1.6 | 15.7 | ~2.5 | 13.0 | |
| 5484-29A | 323 | 3.7 | 51.2 | 1.1 | 2.2 | 17.3 | 2.7 | 13.8 | |
| 5484-56 | 323 | 4.5 | 52.5 | 0.2 | 3.2 | 16.8 | 3.5 | 12.2 | |
| 5484-46 | 325 | 3.7 | 53.2 | 0.7 | 1.8 | 15.2 | — | 14.8 | |
| 5484-47A | 324 | 3.7 | 54.5 | 1.2 | 2.2 | 15.1 | ~2 | 14.8 | |
| 5494-79 | ~333 | ~8.5 | ~62 | ~0.4 | ~6.4 | ~19.0 | ~3.2 | — | |
| 5494-83 | >330[(1)] | — | — | — | — | — | — | — | |
| 5494-29 | 328 | 4.8 | 56.5 | 0.4 | 3.2 | 18.5 | 6.0 | 11.5 | 91 |
| 5494-30 | 331 | 4.0 | 57.5 | 0.3 | 3.6 | 22.5 | 5.0 | 14.5 | 93 |
| 5494-86 | 326 | 5.1 | 65.3 | 0.5 | 3.7 | 21.0 | 4.2 | 12.4 | 95 |
| 5494-88 | ~337 | ~6 | ~67 | ~0.2 | ~4.5 | ~19 | ~2.5 | | ~92 |
| 5494-81 | 332 | 4.6 | 62.7 | 1.2 | 2.6 | 20.6 | ~3.7 | 11.7 | 96 |

[(1)] The highest MEA conversion attained at this temperature was only about 24%

TABLE XVI-B

Zirconia Supported Phosphorus Catalysts

| Catalyst | Cat. Type | Phosphorus on Cat. (wt. %) | Pellet Strength |
|---|---|---|---|
| 5464-72 | | | |
| 5484-37 | | | |
| 5484-6 | H | | 12.7 |
| 5484-63 | H | 3.3 | — |
| 5484-28 | H | 7.4 | — |
| 5484-83 | H | 4.1 | 15.7 |
| 5484-84 | H | 4.7 | 18.7 |
| 5484-85 | H | 5.8 | 32.3 |
| 5494-71 | H | — | 16.7 |
| 5484-64 | J | — | — |
| 5484-29A | J | 3.3 | 19.7 |
| 5484-56 | J | — | — |
| 5484-46 | J | 4.7 | 42.0 |
| 5484-47A | J | 4.2 | 35.3 |
| 5494-79 | K | 6.5 | 13.7 |
| 5494-83 | L | | |
| 5494-29 | M | 0.9 | 8.0 |
| 5494-30 | N | 1.4 | 13.3 |
| 5494-86 | O | 2.4 | 7.0 |
| 5494-88 | P | 2.6 | 12.7 |
| 5494-81 | Q | 2.0 | 6.0 |

With reference to Tables XVI-A and XVI-B, it will be seen that once again there was a good conversion of the monoethanolamine and ethylenediamine to noncyclic products characterized by good yields of diethylenetriamine and triethylenetetramine.

This series of tests demonstrates that the zirconia supported catalysts give results equivalent to those obtained with titania.

An attempt to analyze the zirconia supported catalysts using a scanning electron microscope were unsuccessful because the phosphorus content of the PK - emission line waive length, 6.1549A is very close to the ZrL - emission line, 6.0776A. These two lines could not be resolved using the electronic discriminator with which the scanning electron microscope was fitted.

Insofar as X-ray defraction analysis is concerned, it was determined that the zirconia was an equimix of monoclinic zirconia, baddeleyite and a tetragonal phase usually formed at higher temperatures.

Surface scrapings from the zirconia catalyst that had been treated with the phosphorus compound contained some rather large crystals of $ZrP_2O_7$. Because of their low surface area, it is doubtful that this $ZrP_2O_7$ is responsible for the excellent activity of the zirconia supported catalyst. The $ZrP_2O_7$ X-ray pattern is weak, indicating that $ZrP_2O_7$ represents a small fraction of the phosphorus present. It is probable that another phosphorus compound that is amorphous is the catalytically active species.

EXAMPLE III

Recycle Studies

The IVb metal oxide supports tend to shift product distribution towards diethylenetriamine. There are times when it is desireable to obtain greater yields of triethylenetetramine or tetraethylenepentamine. Accordingly, a series of recycle tests were run to determine the feasibility of recycle of diethylenetriamine. The reaction sequence described above for the 100 ml. reactor was used for the recycle studies. However, 20 wt. % of the ethylenediamine in the feed was replaced with diethylenetriamine in two runs and all of the monoethanolamine was replaced with diethylenetriamine in the other two runs.

The catalyst compositions that were used are identified in Table XVII and the results of the simulated recycle tests are set out in Table XVIII.

TABLE XVII

Catalyst Compositions, Simulated Recycle

| Type | Number | Description |
|---|---|---|
| A | 5494-7 | Titania treated with phosphoric acid for 2 hours |
| A | 5494-8 | Titania treated with phosphoric acid for 2 hours |
| H | 5494-2 | Zirconia treated with phosphoric acid for 2 hours |
| H | 5494-3 | Zirconia treated with phosphoric acid for 2 hours |

TABLE XVIII

Simulated Recycle of Diethylene Triamine

| | Selectivity | | | | | | Ratio: | | Feed |
|---|---|---|---|---|---|---|---|---|---|
| Catalyst | PIP | DETA | AEEA | AEP & HEP | TETA | TEPA | DETA PIP | TETA % NC | Recycle |
| 5494-7 | 3.3 | 51.5 | 1.6 | 2.5 | 29.0 | 6.5 | 15.6 | 96 | 20% DETA |
| 5494-8 | 5.0 | 33 | 1.6 | 5.9 | 39.7 | 22.5 | 6.5 | ~94 | 100% DETA |
| 5494-2 | 5.9 | 32.5 | 0.9 | 5.0 | 21.0 | 7.8 | 5.8 | 88 | 20% DETA |
| 5494-3 | 7.5 | 39.5 | 0.5 | 8.0 | 37.5 | 15.2 | 5.3 | ~85 | 100% DETA |

As will be seen from Table XVIII, with both titania and zirconia, the very high selectivity to noncyclic products was once again obtained. There was a significant increase in the yield of triethylenetetramine and also an improvement in the yield of tetraethylenepentamine.

EXAMPLE IV-A

This example is illustrative of the long term stability and activity of catalyst compositions of the present invention and of the low susceptibility of such catalyst compositions to poisoning.

A fresh batch of catalyst (554-20) was prepared using the procedure of Example Ib to prepare a catalyst as set forth in Example I in respect of catalyst 5494-23.

Catalyst 5544-20 was used for a prolonged life study using the equipment and procedures of Example I. In this instance, however, more severe reaction temperature conditions were used in order to accelerate the effects of long term usage. For this purpose a monoethanolamine conversion of 80% was established and maintained throughout about 2000 hours of reaction time. At the end of that time the run was arbitrarily terminated. Representative results of the test are set forth in Table XIX-A.

TABLE XIX-A

2000 Hour Catalyst Life Study - Titania Having Phosphorous Derived from Phosphoryl Chloride Deposited Thereon

| Elapsed Time | Temp, °C. @ 80% MEA Conversion | Selectivity | | | | | | Ratio: DETA PIP | % NC in TETA |
|---|---|---|---|---|---|---|---|---|---|
| | | PIP | DETA | AEEA | AEP | TETA | TEPA | | |
| 125 | 315 | 2.6 | 48.0 | 0.2 | 2.7 | 17.9 | 2.5 | 18.8 | 93 |
| 715 | 325 | 2.5 | 54.6 | 0 | 2.3 | 19.4 | 4.4 | 21.8 | 95 |
| 925 | 330 | 2.7 | 55.3 | 0.1 | 2.5 | 20.7 | 5.0 | 20.7 | 92 |
| 1195 | 335 | 2.5 | 53.3 | 0.1 | 2.4 | 19.8 | 5.7 | 21.4 | 94 |
| 1340 | 340 | 2.8 | 51.6 | 0 | 2.7 | 21.1 | 5.7 | 18.8 | 91 |
| 1645 | 350 | 3.6 | 48.0 | 0.2 | 3.3 | 19.8 | 5.7 | 13.4 | 92 |
| 1815 | 350 | 3.8 | 48.3 | 0 | 3.4 | 20.6 | 5.8 | 12.9 | ~85 |
| 2012 | 355 | 3.4 | 52.2 | 0 | 3.1 | 20.9 | 5.6 | 15.3 | 93 |

As can be seen from Table XVI-A, the catalyst had good initial selectivity and the selectivity remained good throughout the run.

The temperature required to maintain MEA conversion at 80% increased from 315° C. to about 335° C. during the first 1000 hours of operating, indicating a slight loss in activity. The use of a temperature of 335° C. at the end of the run indicates an overall moderate loss of activity.

EXAMPLE IV-B

Catalyst Regeneration

A titania-supported phosphate catalyst prepared in accordance with Example I was charged to a 100 cc continuous reactor and subjected to an accelerated aging test using, as a feed a mixture of ethylenediamine and monoethanolamine in a ratio of 2 mols of ethylenediamine per mol of monoethanolamine. The feed was charged at a liquid hourly at the rate of about 1 volume of liquid feed per hour per volume of catalyst. Pressure was held at 1500 lbs. (103.4 bar) and the temperature was adjusted to give about an 80% MEA conversion. At the beginning of the run at a temperature of about 325° C., analysis indicated a conversion of monoethanolamine of about 78%, a ratio of diethylenetriamine to piperazine of about 19 and a reaction product containing about 94% noncyclic compounds in the triethylenetetramine fraction. In a duplicate run at 325° the initial MEA conversion is found to be about 81% and the ratio of diethylenetriamine to piperazine was found to be about 17% the percent of noncyclic products in the triethylenetetramine fraction was found to be about 93%. In order to simulate a prolonged run, an accelerated aging procedure was used wherein the catalyst bed was held at reaction conditions without feed for a period of about 2 weeks. After the 2 week period, a temperature of about 345° C. was required to obtain about an 80% conversion of monoethanolamine. In a specific run, after two weeks of accelerated aging, MEA conversion was 83%, the ratio of DETA to PIP was 7 with only about 72% noncyclic products in the TETA fraction.

Thereafter, the catalyst was regenerated in accordance with the following procedure:
(1) The catalyst bed was heated to about 450° C.;
(2) a mixture of about 100 cc per minute of air in 700 cc per minute of nitrogen was passed through the catalyst bed for about 1 hour;
(3) Next a mixture of about 100 cc per minute of air and 300 cc per minute of nitrogen was passed over the catalyst bed for about 1 hour;
(4) Thereafter air was charged without inert gas at the rate of 100 cc per minute for 2 hours; and
(5) The catalyst bed was flushed with nitrogen while cooling over night.

After regeneration the catalyst was again tested for activity and at a temperature of 325° C. the monoethanolamine conversion was about 77%; the ratio of diethylenetriamine to piperazine was about 19 and the percentage of noncyclic products in triethylenetetramine fraction was once again 94%. Thus, regeneration had been successfully performed.

When the preceding regeneration procedure was attempted at 350° C., regeneration was unsuccessful while at 400° C. the results were unsatisfactory.

An attempt to regenerate the catalyst by heating at 350° C. in a nitrogen stream was unsuccessful.

An attempt to regenerate the catalyst by washing at 250° C. with feed was also ineffective.

EXAMPLE V

This example is illustrative of the utility of hafnia as a support in the preparation and use of the catalyst compositions of the present invention.

The amount of hafnia available was insufficient to permit the preparation of the number of pellets required for a continuous evaluation using the equipment and reaction conditions of Example I. However, enough hafnia was available to permit a batch evaluation using powdered catalyst.

Catalyst Preparation

Typically, these catalysts were prepared by addition of 50 g of the metal oxide powder to 150 cc of 85% $H_3PO_4$ at 130° C. This temperature was maintained for approximately five hours. The solids were then separated by filtration through a fritted glass funnel; filter paper systems were not adequate as the phosphoric acid caused disintegration of the paper and subsequent product loss. The product was then washed to remove excess phosphoric acid and dried.

General Experimental Procedures

All batch reactions were carried out in a 300 cc stainless steel, rocking autoclave. They were used with glass liners to minimize the effects of catalyst derived impurities from the clave walls.

The general procedure consisted of placing 6.1 g (20 wt % basis MEA) of catalyst in a liner followed by addition of 60.5 g of a 1.1 EDA/MEA mixture (30 g EDA and 30.5 g MEA). THe liner was placed in the reactor, the system was purged with nitrogen, and finally heated to 315° C. for 2 hours. The crude reaction product was filtered from the catalyst and analyzed by GC using an OV-17 chromatography column.

The supports used for this series of tests included titania, zirconia and hafnia. Powdered T1067 was also run to provide a basis for comparison.

The results are set forth in Table XX.

TABLE XX

Batch Run Evaluation of Titania, Zirconia and Hafnia as Catalyst Supports

| Catalyst Support | Conversion | | Selectivity | | | Ratio: DETA |
|---|---|---|---|---|---|---|
| | EDA | MEA | PIP | DETA | AEEA | PIP |
| Titania | 51 | 83 | | | | 6.5 |
| Zirconia | 3.5 | 5.2 | | | | 5.1 |
| Hafnia | 5.8 | 6.4 | 4.7 | 65.7 | 5.4 | 14.0 |
| T-1067 | 6.3 | 17.7 | 3.0 | 53.7 | 17.9 | 17.7 |

Batch tests such as those summarized in Table XX are characterized by poor reproducibility. However, they do provide a qualitative measure of catalyst suitability.

It can be concluded from the results of Table XVIII that pelleted thermally activated catalyst compositions comprising hafnia having phosphorus derived from phosphoric acid deposited thereon will give results analogous to those obtained in Example I and Example II where titania and zirconia, respectively, were used as supports.

The foregoing examples of the present invention have been given by way of illustration only and are not intended as limitations on the scope of the invention which is defined by the following claims.

We claim:

1. A method for preparing a catalytically active composition consisting essentially of a pelleted group IVb transition metal oxide having about 0.5 to about 5 wt. % of phosphorus thermally chemically bonded to at least the surface thereof in the form of hydroxy-containing phosphate groups, said method comprising the steps of impregnating pellets of a group IVb transition metal oxide with an aqueous solution of a water soluble phosphorus compound containing phosphorus-oxygen bonds at a temperature of about 20° to about 150° C., whereby from about 0.5 to about 6 wt. % of phosphorus is bonded to at least the surface of said pellets, removing unadsorbed liquid from said thus-impregnated pellets, and then stabilizing said pellets by calcination at a temperature within the range of about 200° to about 900° C. sufficient to thermally chemically bond said 0.5 to 6 wt. % of phosphorus to said pellets in the form of hydroxy-containing phosphate groups.

2. A method of preparing a catalytically active composition consisting of a pelleted group IVb transition metal oxide having about 0.5 to about 6 wt. % of phosphorus thermally chemically bonded to at least the surface thereof in the form of hydroxy-containing phosphate groups, said method consisting essentially of the steps of impregnating pellets of a group IVb transition metal oxide with an aqueous solution of a water soluble phosphorus compound containing phosphorus-oxygen bonds at a temperature of less than about 100° C., whereby from about 0.5 to about 6 wt. % of phosphorus is bonded to at least the surface of said pellets, removing unadsorbed liquid from said thus-impregnated pellets and stabilizing said impregnated pellets by calcination conducted at a temperature of about 200° to about 900° C. for a period of time of at least about 0.5 to about 5 hours sufficient to thermally chemically bond said 0.5 to 6 wt. % of phosphorus to said pellets in the form of hydroxy-containing phosphate groups.

3. A method for preparing a catalytically active composition consisting of a pelleted group IVb transition metal oxide having about 0.5 to about 6 wt. % of phosphorus thermally chemically bonded to at least the surface thereof in the form of hydroxy-containing phosphate groups, said method consisting essentially of the steps of impregnating said pellets with an aqueous solution of a water soluble phosphorus compound containing phosphorus-oxygen bonds at a temperature of about 100° to about 150° C. for a period of time within the range of about 0.5 to about 5 hours sufficient to thermally chemically bond said 0.5 to 6 wt. % of phosphorus to said pellets, water washing and draining said thus treated pellets to remove unadsorbed liquid and thereafter recovering and drying the thus treated pellets.

4. A method as in claim 3, wherein the pellets are stabilized by a calcining step conducted at a temperature within a range from about 200° to about 900° C.

5. A method of preparing a catalytically active composition consisting essentially of pelleted titania having about 0.5 to about 6 wt. % of phosphorus thermally chemically bonded to at least the surface thereof in the form of hydroxy-containing phosphate groups, said method consisting essentially of the steps of impregnating titania pellets with na aqueous solution of a water soluble phosphorus compound containing phosphorus-oxygen bonds, at a temperature of less than about 100° C. whereby from about 0.5 to about 6 wt. % of phosphorus is bonded to at least the surface of said pellets draining unabsorbed liquid from said thus-impregnated pellets and stabilizing said impregnated pellets by calcination conducted at a temperature of about 200° to about 900° C. for a period of time of at least about 0.5 to about 5 hours sufficient to thermally chemically bond said 0.5 to 6 wt. % of phosphorus to said pellets in the form of hydroxy-containing phosphate groups.

6. A method as in claim 5, wherein the source of the phosphorus is phosphorous acid.

7. A method as in claim 5, wherein the source of the phosphorus is phosphoric acid.

8. A method as in claim 5, wherein the source of the phosphorus is polyphosphoric acid.

9. A method for preparing a catalytically active composition consisting of pelleted titania having about 0.5 to about 6 wt. % of phosphorus thermally chemically bonded to at least the surface thereof in the form of hydroxy-containing phosphate groups, said method consisting essentially of the steps of impregnating said pellets with an aqueous solution of a water soluble phosphorus compound containing phosphorusoxygen bonds at a temperature of about 100° to about 150° C. for a period of time within the range of about 0.5 to about 5 hours sufficient to thermally chemically bond said 0.5 to 6 wt. % of phosphorus to said pellets, water washing and draining said thus treated pellets to remove unadsorbed liquid and thereafter recovering and drying the thus treated pellets.

10. A method as in claim 9, wherein the pellets are stabilized by a calcining step conducted at a temperature within a range from about 200° to about 900° C.

11. A method as in claim 10, wherein the source of the phosphorus is phosphorous acid.

12. A method as in claim 10, wherein the source of the phosphorus is phosphoric acid.

13. A method as in claim 10, wherein the source of the phosphorus is polyphosphoric acid.

14. A method as in claim 10, wherein the source of the phosphorus is a trialky phosphate or a trialkyl phosphite.

15. A method as in claim 14, wherein the source of the phosphorus is trimethyl phosphate.

16. A method as in claim 14, wherein the source of the phosphorus is triethyl phosphite.

17. A method as in claim 10 wherein the source of the phosphorus is a diaminohydrogen phosphate.

18. A method as in claim 17 wherein the source of the phosphorus is diammonium hydrogen phosphate.

19. A method for preparing a catalytically active composition consisting of pelleted zirconia having about 0.5 to about 6 wt. % of phosphorus thermally chemically bonded to at least the surface thereof in the form of hydroxy-containing phosphate groups, said method consisting essentially of the steps of impregnating said pellets with an aqueous solution of a water soluble phosphorus compound containing phosphorusoxygen bonds at a temperature of about 100° to about 150° C. for a period of time within the range of about 0.5 to about 5 hours sufficient to thermally chemically bond said 0.5 to 6 wt. % of phosphorus to said pellets, water washing and draining said thus treated pellets to remove unadsorbed liquid and thereafter recovering and drying the thus treated pellets.

20. A method as in claim 19, wherein the pellets are stabilized by a calcining step conducted at a temperature within a range from about 200° to about 900° C.

21. A method as in claim 20, wherein the source of the phosphorus is phosphoric acid.

22. A method as in claim 20, wherein the source of the phosphorus is phosphorous acid.

23. A method as in claim 20, wherein the source of the phosphorus is polyphosphoric acid.

24. A method of preparing a catalyst composition which consists of the steps of impregnating pellets of titania with phosphoric acid at a temperature of about 100° to about 150° C. for a period of time ranging from about 0.5 to about 5 hours sufficient to thermally convert said phosphoric acid to $Ti(HPO_4)\cdot2H_2O$ and to chemically bond said $Ti(HPO_4)\cdot2H_2O$ in the form of hydroxy-containing phosphate groups to said titania in an amount ranging from about 0.5 to about 6 wt. % of phosphorus based on the titania, water washing, recovering and drying the thus treated pellets and calcining said thus-treated pellets at a temperature within a range from about 200° to about 900° C. to convert said $Ti(HPO_4)\cdot2H_2O$ to $HTi_2(PO_4)_3$, said $HT_2(PO_4)_3$ having the indexed refraction pattern:

| Intensity | d-Spacings, A Obsd | d-Spacings, A Calculated[1] | Miller Indices |
|---|---|---|---|
| w | 6.05 | 6.11 | (012) |
| w | 4.35 | 4.41 | (014) |
| w | 4.20 | 4.23 | (110) |
| m | 3.68 | 3.68 | (006) |
| s | 3.50 | 3.48 | (202) $TiO_2$ also |
| m | 3.32 | 3.29 | (106) |
| w | 3.22 | 3.16 | (007) |
| w | 3.03 | 3.05 | (024) |
| m | 2.75 | 2.75 | (211) |
| m | 2.03 | 2.04 | (036) |
| w | 1.95 | 1.96 | (128) |
| w | 1.83 | 1.84 | (0.0.12) |
| w | 1.60 | 1.60 | (140) |
| w | 1.28 | 1.28 | (514) |

-continued

| Intensity | d-Spacings, A Obsd | d-Spacings, A Calculated[1] | Miller Indices |
|---|---|---|---|
| w | 1.25 | 1.25 | (3.1.14) |

[1]Calculated using $1/d = \sqrt{4/3(1/a^2)(h^2 + hk + k^2) + (1/c^2)l^2}$, where hkl are Miller indices, a and c are lattice constants, 8.474 and 22.11A, respectively.

and wherein "w", "m" and "s" represent, respectively, bands of weak, moderate and strong intensity.

25. As a new composition of matter, a catalytically active composition consisting essentially of a pelleted group IVb transition metal oxide having about 0.5 to about 6 wt. % of phosphorus thermally chemically bonded to at least the surface thereof in the form of hydroxy-containing phosphate groups, said composition having been prepared by impregnating pellets of a group IVb transition metal oxide with an aqueous solution of a water soluble phosphorus compound containing phosphorus-oxygen bonds and then either sequentially draining said thus impregnated pellets, whereby about 0.5 to 6 wt. % of phosphorus is bonded to at least the surface of said pellets, or simultaneously heating said impregnated pellets at a temperature of about 100° to about 150° C. For a period of time within the range of about 0.5 to about 5 hours sufficient to bond said 0.5 to 6 wt. % of phosphorus to said pellets in the form of hydroxy-containing phosphate groups followed by calcining of said thus-treated impregnated and heated or impregnated and drained pellets at a temperature within the range of about 200° to about 900° C., whereby said 0.5 to 6 wt. % of phosphorus is thermally, chemically bonded to said pellets.

26. As a new composition of matter, a catalytically active composition consisting essentially of a pelleted group IVb transition metal oxide having about 0.5 to about 6 wt. % of phosphorus thermally chemically bonded to at least the surface thereof in the form of hydroxy-containing phosphate groups, said composition having been prepared by impregnating pellets of a group IVb transition metal oxide with an aqueous solution of a water soluble phosphorus compound containing phosphorus-oxygen bonds at a temperature of about 100° to about 150° C. and thereafter water washing, drying and stabilizing said pellets by calcination at a temperature of about 200° to about 900° C. for a period of time within the range of about 0.5 to about 5 hours sufficient to thermally, chemically bond said 0.5 to 6 wt. % of phosphorus to said pellets.

27. A composition as in claim 26, wherein the group IVb transition metal oxide is titania.

28. A composition as in claim 26 wherein the group IVb transition metal oxide is zirconia.

29. A composition as in claim 26 wherein the group IVb transition metal oxide is hafnia.

30. As a new composition of matter, a catalytically active composition consisting essentially of a pelleted group IVb transition metal oxide having about 0.5 to about 6 wt. % of phosphorus thermally chemically bonded to at least the surface thereof in the form of hydroxy-containing phosphate groups, said composition having been prepared by a process consisting essentially of the steps of impregnating pellets of a group IVb transition metal oxide with an aqueous solution of a water soluble phosphorus compound containing phosphorus-oxygen bonds at a temperature between about 20° and about 100° C. to bond said 0.5 to 6 wt. % of phosphorus to said pellets, draining unabsorbed liquid from said thus-impregnated pellets and stabilizing said impregnated pellets by calcination conducted at a temperature of about 200° to about 900° C. for a period of time of at least about 0.5 to about 5 hours sufficient to thermally chemically bond said 0.5 to 6 wt. % of phosphorus to said pellets in the form of hydroxy-containing phosphate groups.

31. As a new composition of matter, a catalytically active composition consisting essentially of a pelleted group IVb transition metal oxide having about 0.5 to about 6 wt. % of phosphorus thermally chemically bonded to at least the surface thereof in the form of hydroxy-containing phosphate groups, said composition having been prepared by a process consisting essentially of the steps of impregnating said pellets with an aqueous solution of a water soluble phosphorus compound containing phosphorus-oxygen bonds at a temperature of about 100° to about 150° C. for a period of time within the range of about 0.5 to about 5 hours sufficient to thermally chemically bond said 0.5 to 6 wt. % of phosphorus to said pellets, water washing and and thereafter recovering and drying the thus treated pellets.

32. A composition as in claim 31, wherein the pellets are stabilized by a calcining step conducted at a temperature within a range from about 200° to about 900° C.

33. As a new composition of matter, a catalytically active composition consisting essentially of pelleted titania having about 0.5 to about 6 wt. % of phosphorus thermally chemically bonded to at least the surface thereof in the form of hydroxy-containing phosphate groups, said composition having been prepared by a process consisting essentially of the steps of impregnating titania pellets with an aqueous solution of a water soluble phosphorus compound containing phosphorus-oxygen bonds and then either simultaneously heating said impregnated pellets at a temperature of about 100° to about 150° C. for a period of time within the range of about 0.5 to about 5 hours sufficient to thermally chemically bond said 0.5 to 6 wt. % of phosphorus to said pellets in the form of hydroxy-containing phosphate groups followed by water washing and drying, draining said impregnated pellets, and thereafter calcining said thus-treated impregnated and heated or drained and heated pellets at a temperature within the range of about 200° to about 900° C.

34. As a new composition of matter, a catalytically active composition consisting essentially of a pelleted titania having about 0.5 to about 6 wt. % of phosphorus thermally chemically bonded to at least the surface thereof in the form of hydroxy-containing phosphate groups, said composition having been prepared by a process consisting essentially of the steps of impregnating titania pellets with an aqueous solution of a water soluble phosphorus compound containing phosphorus-oxygen bonds at a temperature of about 20° to about 150° C. whereby from about 0.5 to about 6 wt. % of phosphorus is bonded to at least the surface of said pellets, removing unabsorbed liquid from said thus-impregnated pellets and stabilizing said impregnated pellets by calcination conducted at a temperature of about 200° to about 900° C. for a period of time of at least about 0.5 to about 5 hours sufficient to thermally chemically bond said 0.5 to 6 wt. % of phosphorus to said pellets in the form of hydroxy-containing phosphate groups.

35. A composition as in claim 34, wherein the source of the phosphorus is phosphoric acid.

36. A composition as in claim 34, wherein the source of the phosphorus is polyphosphoric acid.

37. As a new composition of matter, a catalytically active composition consisting essentially of pelleted titania having about 0.5 to about 6 wt. % of phosphorus thermally chemically bonded to at least the surface thereof in the form of hydroxy-containing phosphate groups, said composition having been prepared by a process consisting essentially of the steps of impregnating said titania pellets with an aqueous solution of a water soluble phosphorus compound containing phosphorus-oxygen bonds at a temperature of about 100° to about 150° C. for a period of time within the range of about 0.5 to about 5 hours sufficient to thermally chemically bond said 0.5 to 6 wt. % of phosphorus to said pellets, water washing and draining said thus treated pellets to remove unadsorbed liquid and thereafter recovering and drying the thus treated pellets.

38. A composition as in claim 37, wherein the pellets are stabilized by a calcining step conducted at a temperature within a range from about 200° to about 900° C.

39. A composition as in claim 38, wherein the titania pellets are impregnated with aqueous phosphoric acid and wherein composition consists essentially of titanium triphosphate thermally chemically bound to the titania support, said titanium triphosphate having the formula $HTi_2(PO_4)_3$, said $HTi_2(PO_4)_3$ having the indexed refraction pattern:

| Intensity | d-Spacings, A Obsd | Calculated[1] | Miller Indices |
|---|---|---|---|
| w | 6.05 | 6.11 | (012) |
| w | 4.35 | 4.41 | (014) |
| w | 4.20 | 4.23 | (110) |
| m | 3.68 | 3.68 | (006) |
| s | 3.50 | 3.48 | (202) $TiO_2$ also |
| m | 3.32 | 3.29 | (106) |
| w | 3.22 | 3.16 | (007) |
| w | 3.03 | 3.05 | (024) |
| m | 2.75 | 2.75 | (211) |
| m | 2.03 | 2.04 | (036) |
| w | 1.95 | 1.96 | (128) |
| w | 1.83 | 1.84 | (0.0.12) |
| w | 1.60 | 1.60 | (140) |
| w | 1.28 | 1.28 | (514) |
| w | 1.25 | 1.25 | (3.1.14) |

[1]Calculated using $1/d = \sqrt{4/3(1/a^2)(h^2 + hk + k^2) + (1/c^2)l^2}$, where hkl are Miller indices, a and c are lattice constants, 8.474 and 22.11A, respectively.

and wherein "w", "m" and "s" represent, respectively, bands of weak, moderate and strong intensity.

40. A method for preparing a catalytically active composition consisting essentially of a pelleted titania having about 0.5 to about 6 wt. % of phosphorus thermally chemically bonded to at least the surface thereof in the form of hydroxy-containing phosphate groups, said method consisting essentially of the steps of impregnating titania pellets with an aqueous solution of a water soluble phosphorus compound containing phosphorus-oxygen bonds at a temperature of about 20° to about 150° C., whereby from about 0.5 to about 6 wt. % of phosphorus is bonded to at least the surface of said pellets, removing unabsorbed liquid from said thus-impregnated pellets, and then stabilizing said pellets by calcination at a temperature within the range of about 200° to about 900° C. sufficient to thermally chemically bond said 0.5 to 6 wt. % of phosphorus to said pellets in the form of hydroxy-containing phosphate groups.

41. A method for preparing a catalytically active composition consisting essentially of a pelleted zirconia having about 0.5 to about 6 wt. % of phosphorus thermally chemically bonded to at least the surface thereof in the form of hydroxy-containing phosphate groups, said method consisting essentially of the steps of impregnating zirconia pellets with an aqueous solution of a water soluble phosphorus compound containing phosphorus-oxygen bonds at a temperature of about 20° to about 150° C., whereby from about 0.5 to about 6 wt. % of phosphorus is bonded to at least the surface of said pellets, removing unabsorbed liquid from said thus-impregnated pellets, and then stabilizing said pellets by calcination at a temperature within the range of about 200° to about 900° C. sufficient to thermally chemically bond said 0.5 to 6 wt. % of phosphorus to said pellets in the form of hydroxy-containing phosphate groups.

42. A catalytically active composition consisting of a pelleted titania having about 0.5 to about 6 wt. % of phosphorus thermally chemically bonded to at least the surface thereof in the form of hydroxy-containing phosphate groups, said composition having been prepared by the method consisting essentially of the steps of impregnating titania pellets with an aqueous solution of a water soluble phosphorus compound containing phosphorus-oxygen bonds at a temperature of less than about 100° C., removing unabsorbed liquid from said thus-impregnated pellets whereby from about 0.5 to about 6 wt. % of phosphorous is bonded to at least the surface of said pellets, and stabilizing said impregnated pellets by calcination conducted at a temperature of about 200° to about 900° C. for a period of time of at least about 0.5 to about 5 hours sufficient to thermally chemically bond said 0.5 to 6 wt. % of phosphorus to said pellets in the form of hydroxy-containing phosphate groups.

43. A catalytically active composition consisting essentially of a pelleted group IVb transition metal oxide having about 0.5 to about 6 wt. % of phosphorus thermally chemically bonded to at least the surface thereof in the form of hydroxy-containing phosphate groups, said composition having been prepared by the method consisting essentially of the steps of impregnating pellets of a group IVb transition metal oxide with an aqueous solution of a water soluble phosphorus compound containing phosphorus-oxygen bonds at a temperature of about 20° to about 150° C., whereby from about 0.5 to about 6 wt. % of phosphorus is bonded to at least the surface of said pellets, removing unabsorbed liquid from said thus-impregnated pellets, and thereafter stabilizing said pellets by calcination at a temperature within the range of about 200° to about 900° C. sufficient to thermally chemically bond said 0.5 to 6 wt. % of phosphorus to said pellets in the form of hydroxy-containing phosphate groups.

* * * * *